(12) United States Patent
Hill et al.

(10) Patent No.: US 9,288,545 B2
(45) Date of Patent: Mar. 15, 2016

(54) SYSTEMS AND METHODS FOR TRACKING AND TAGGING OBJECTS WITHIN A BROADCAST

(71) Applicant: Fox Sports Productions, Inc., Los Angeles, CA (US)

(72) Inventors: David B. Hill, Pacific Palisades, CA (US); Michael Davies, Los Angeles, CA (US); Zachary Fields, Woodland Hills, CA (US); David Eric Shanks, Los Angeles, CA (US)

(73) Assignee: FOX SPORTS PRODUCTIONS, INC., Los Angeles, CA (US)

( * ) Notice: Subject to any disclaimer, the term of this patent is extended or adjusted under 35 U.S.C. 154(b) by 0 days.

(21) Appl. No.: 14/804,637

(22) Filed: Jul. 21, 2015

(65) Prior Publication Data
US 2015/0326932 A1 Nov. 12, 2015

Related U.S. Application Data

(60) Provisional application No. 62/091,502, filed on Dec. 13, 2014.

(51) Int. Cl.
| | |
|---|---|
| H04N 7/10 | (2006.01) |
| H04N 7/025 | (2006.01) |
| H04N 21/478 | (2011.01) |
| H04N 21/81 | (2011.01) |
| H04N 21/431 | (2011.01) |

(52) U.S. Cl.
CPC ....... *H04N 21/4781* (2013.01); *H04N 21/4312* (2013.01); *H04N 21/8133* (2013.01); *H04N 21/8146* (2013.01)

(58) Field of Classification Search
CPC .......... H04N 21/4781; H04N 21/8133; H04N 21/8146; H04N 21/4312
See application file for complete search history.

(56) References Cited

U.S. PATENT DOCUMENTS

| | | | |
|---|---|---|---|
| 4,184,270 A * | 1/1980 | Presbrey | A63B 57/00 434/151 |
| 5,729,471 A | 3/1998 | Jain et al. | |
| 6,144,375 A | 11/2000 | Jain et al. | |
| 6,201,554 B1 | 3/2001 | Lands | |
| 6,525,690 B2 * | 2/2003 | Rudow | A63B 24/0021 342/357.4 |
| 7,315,631 B1 | 1/2008 | Corcoran et al. | |
| 7,529,298 B2 | 5/2009 | Yasuda | |
| 7,839,926 B1 | 11/2010 | Metzger et al. | |
| 8,495,697 B1 | 7/2013 | Goldfeder et al. | |

(Continued)

FOREIGN PATENT DOCUMENTS

| | | |
|---|---|---|
| JP | 2008005110 | 1/2008 |
| JP | 2008199370 | 8/2008 |

(Continued)

OTHER PUBLICATIONS

EP Application No. 12822586.9 Extended European Search Report dated Feb. 5, 2015, 6 pages.

(Continued)

*Primary Examiner* — Oschta Montoya
(74) *Attorney, Agent, or Firm* — Cantor Colburn LLP

(57) ABSTRACT

The present disclosure presents an improved system and method for tracking and tagging objects of interest in a broadcast, including expert indications of desirable and undesirable locations on golf course terrain.

20 Claims, 39 Drawing Sheets

(56) References Cited

U.S. PATENT DOCUMENTS

| | | | |
|---|---|---|---|
| 2002/0082122 A1* | 6/2002 | Pippin | A63B 57/00 473/407 |
| 2003/0009270 A1 | 1/2003 | Breed | |
| 2003/0021445 A1 | 1/2003 | Larice et al. | |
| 2004/0218099 A1 | 11/2004 | Washington | |
| 2005/0052533 A1 | 3/2005 | Ito et al. | |
| 2005/0237385 A1 | 10/2005 | Kosaka et al. | |
| 2006/0197839 A1 | 9/2006 | Senior et al. | |
| 2007/0024706 A1 | 2/2007 | Brannon, Jr. et al. | |
| 2008/0129844 A1 | 6/2008 | Cusack et al. | |
| 2008/0261711 A1* | 10/2008 | Tuxen | A63B 24/0021 473/199 |
| 2009/0021583 A1 | 1/2009 | Salgar et al. | |
| 2009/0040308 A1 | 2/2009 | Ternovskiy | |
| 2009/0066782 A1 | 3/2009 | Choi et al. | |
| 2009/0082139 A1* | 3/2009 | Hart | A63B 24/0003 473/407 |
| 2009/0136226 A1 | 5/2009 | Wu et al. | |
| 2009/0140976 A1 | 6/2009 | Bae et al. | |
| 2009/0271821 A1 | 10/2009 | Zalewski | |
| 2009/0284601 A1 | 11/2009 | Eledath et al. | |
| 2010/0265344 A1 | 10/2010 | Velarde et al. | |
| 2010/0289904 A1 | 11/2010 | Zhang et al. | |
| 2010/0289913 A1 | 11/2010 | Fujiwara | |
| 2011/0157370 A1 | 6/2011 | Livesey | |
| 2011/0169959 A1 | 7/2011 | Deangelis et al. | |
| 2011/0181728 A1 | 7/2011 | Tieman et al. | |
| 2013/0033605 A1 | 2/2013 | Davies et al. | |

FOREIGN PATENT DOCUMENTS

| | | |
|---|---|---|
| JP | 2012034365 | 2/2012 |
| JP | 2013020308 | 1/2013 |
| KR | 1020090056047 | 6/2009 |
| WO | 2008057285 | 5/2008 |
| WO | WO2010019024 | 2/2010 |

OTHER PUBLICATIONS

International Application No. PCT/US2013/057450 International Search Report and Written Opinion dated Dec. 27, 2013, 12 pages.
International Application No. PCT/US2014/025362 International Search Report and Written Opinion dated Aug. 19, 2014, 15 pages.
New Zealand Application No. 620992 First Examination Report dated Jul. 15, 2014, 2 pages.
PCT Application No. PCT/US2012/049707 Written Opinion and International Search Report dated Jan. 7, 2013, 13 pages.
U.S. Appl. No. 13/567,323 Non-Final Office Action dated Mar. 2, 2015, 30 pages.
CN Application No. 201280044974.9 First Office Action and Search Report Issued Sep. 30, 2015, 14 pages.
EP Application No. 15156533.0 Extended European Search Report dated Jun. 10, 2015, 6 pages.
U.S. Appl. No. 13/567,323 Final Office Action dated Sep. 24, 2015, 31 pages.
U.S. Appl. No. 14/424,632 Non-Final Office Action dated Nov. 6, 2015, 25 pages.
U.S. Appl. No. 14/207,998 Non-Final Office Action dated Dec. 2, 2015, 33 pages.

* cited by examiner

SYSTEMS AND METHODS FOR TRACKING AND TAGGING OBJECTS WITHIN A BROADCAST

CROSS-REFERENCE TO RELATED APPLICATIONS

This patent application claims priority to U.S. Provisional Application No. 62/091,502, filed Dec. 13, 2014, which is incorporated herein by reference in its entirety.

BACKGROUND

The present disclosure relates to systems and methods for tracking and tagging of objects within a broadcast. In exemplary embodiments, the present disclosure relates to improved methods for systematically analyzing a broadcast, specifically tracking of players on a sports field and selectively tagging those players during a broadcast.

While general identification of objects within a broadcast has been known, there is room in the field for improvement, for example by selectively tracking one or more objects within a broadcast along tagging that object and including additional information with regard to that object, as is described herein.

Accordingly, the following disclosure describes tracking of one or of a plurality of objects, e.g., one or multiple football players on a field during broadcast, along with broadcast animated tracking and provision of information, e.g., statistics, of those one or more players.

SUMMARY

The above described presents an improved system and method for tracking and tagging objects of interest in a broadcast. While the following is described in reference various, the present disclosure is not so limited. Indeed, the present disclosure relates more generally to tracking and tagging of any kind of objects, inclusive of highlighting of objects and overlays of information, such as distance, projected trajectories, and environmental conditions, such as wind, heat and terrain.

In exemplary embodiments, one or more objects within a broadcast are tracked (tracking includes locating or identifying) and tagged with information, e.g., information relevant to a play or to performance of an athlete on a field of play.

In an exemplary embodiment, a system and method for tracking and tagging objects of interest in a broadcast includes providing an indication of terrain of a golf course and rendering graphics in a broadcast over and relative to the terrain of said golf course, the graphics indicative of a golf expert's indications of desirable and/or undesirable locations for golf play.

In other exemplary embodiments, graphics provide indication of desirable and undesirable locations for golf play, e.g., as good and bad spots to land a ball from a preceding position (e.g., a tee shot).

In exemplary embodiments, indications by an expert takes into account objective and subjective factors, such as expert opinion on places that might leave a player in a good or bad position in considering a following shot. Further, in exemplary embodiments, the position, size or shape of the indicated good and bad spots vary according to one or more of the length of the preceding shot, anticipated conditions of the terrain, time of day, lighting, wind conditions, physical capabilities of players, contestant skill sets and unanticipated hazards. Additionally, in exemplary embodiments, the position, size and shape of the indicated good and bad spots may be generated prior to game play and may be changed prior to or during game play to reflect a change in at least one factor, such as the length of the preceding shot, anticipated conditions of the terrain, time of day, lighting, wind conditions, physical capabilities of players, contestant skill sets and unanticipated hazards.

In exemplary embodiments, expert indication is provided by a user interface, comprising one or more of a computer terminal, a tablet, a touchscreen product and a mobile device. In exemplary embodiments, indication is provided on a 3D rendering of golf course terrain relative to at least one predetermined camera shot, which the indication overlaid relative to said terrain, e.g., as an overlay utilizing red color for undesirable locations and green color for desirable locations.

The above discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the following FIGURES.

DETAILED DESCRIPTION

As was noted above, the present disclosure relates to an improved system and method for tracking and tagging objects of interest in a broadcast. While the following is described in reference to an athletic performer, the present disclosure is not so limited. Indeed, the present disclosure relates more generally to tracking and tagging of any kind of objects.

In exemplary embodiments, one or more objects within a broadcast are tracked and tagged with information, e.g., information relevant to a play or to performance of an athlete on a field of play.

An automated system might track one, a plurality or all players on a field, such that an operator may easily select one or more players during a broadcast. Such selection may permit an operator to supply, or may present one or more preselected options, e.g., statistics in general or relevant to a given play (e.g., number of successful completions for a receiver in general or given a particular circumstance), statistics relevant to a given player.

Other exemplary embodiments provide for video overlay of such statistics during (or after) a broadcast of information, e.g., statistics, name, etc., relevant to a player. Such video may be static or dynamic, fully or partially displayed (e.g., when a player moves off the broadcasted display), solid, faded, phased in or out, colored, etc.

It should be noted that partial display of information relates to the idea that tagging need not be specifically related to a displayed broadcast image, but rather to the recorded images, whether selectively displayed or not during a broadcast. Tracking and tagging can be larger than the displayed portion during broadcast, and can wander in and out of the broadcast image itself, as desired or not. Further, delayed tracking, or delayed broadcast is contemplated, to allow an operator or an animator to tag a player of interest, if real time is not sufficient for either or any party. Such tagging may be via linked terminals or via wireless devices, such as tablets, which are either generally associated with the network or specifically identified to the network (e.g., assigned to a specific animator, operator, etc.).

Exemplary embodiments also provide for tracking of one or plural players across a field, wherein the video information perfectly or imperfectly follows a player during play motion. Imperfect follow may be desired in certain circumstances, e.g., to enhance the perceived motion of the player, e.g., during breaking of a tackle, a particular cut or breakout move. Further, rise or fade of a statistic graphic can be strategically orchestrated to prevent distraction from a play but also to provide unobtrusive secondary information to a viewer of broadcast content. The various attached FIGURES illustrate the point, e.g., partial entry of Andrew Hawkins (this is a simulated overlay on an established game) for a kickoff return.

Figure 1:
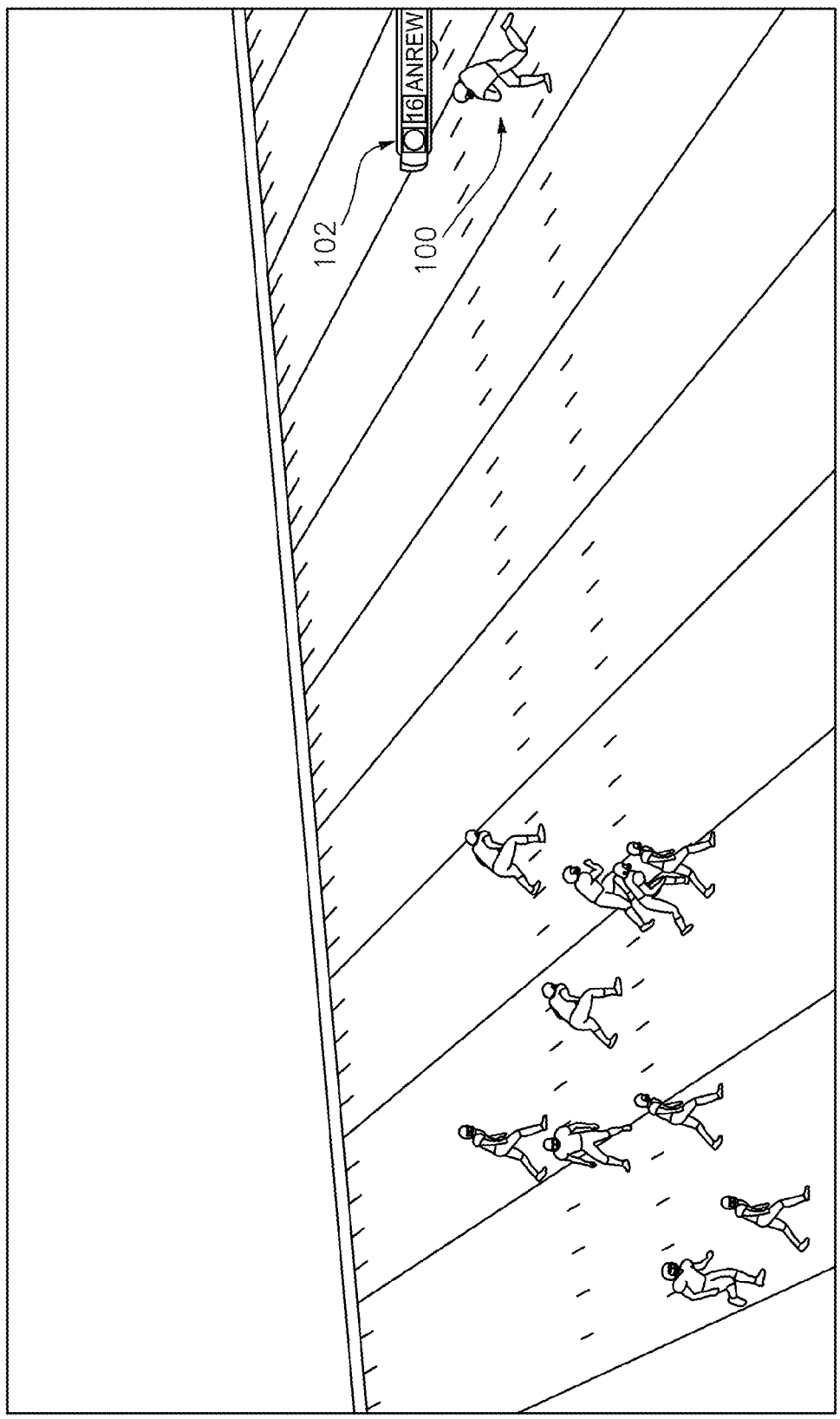
FIG. 1 is an illustration of an exemplary tracked athlete on a field of play.
Figure 2:
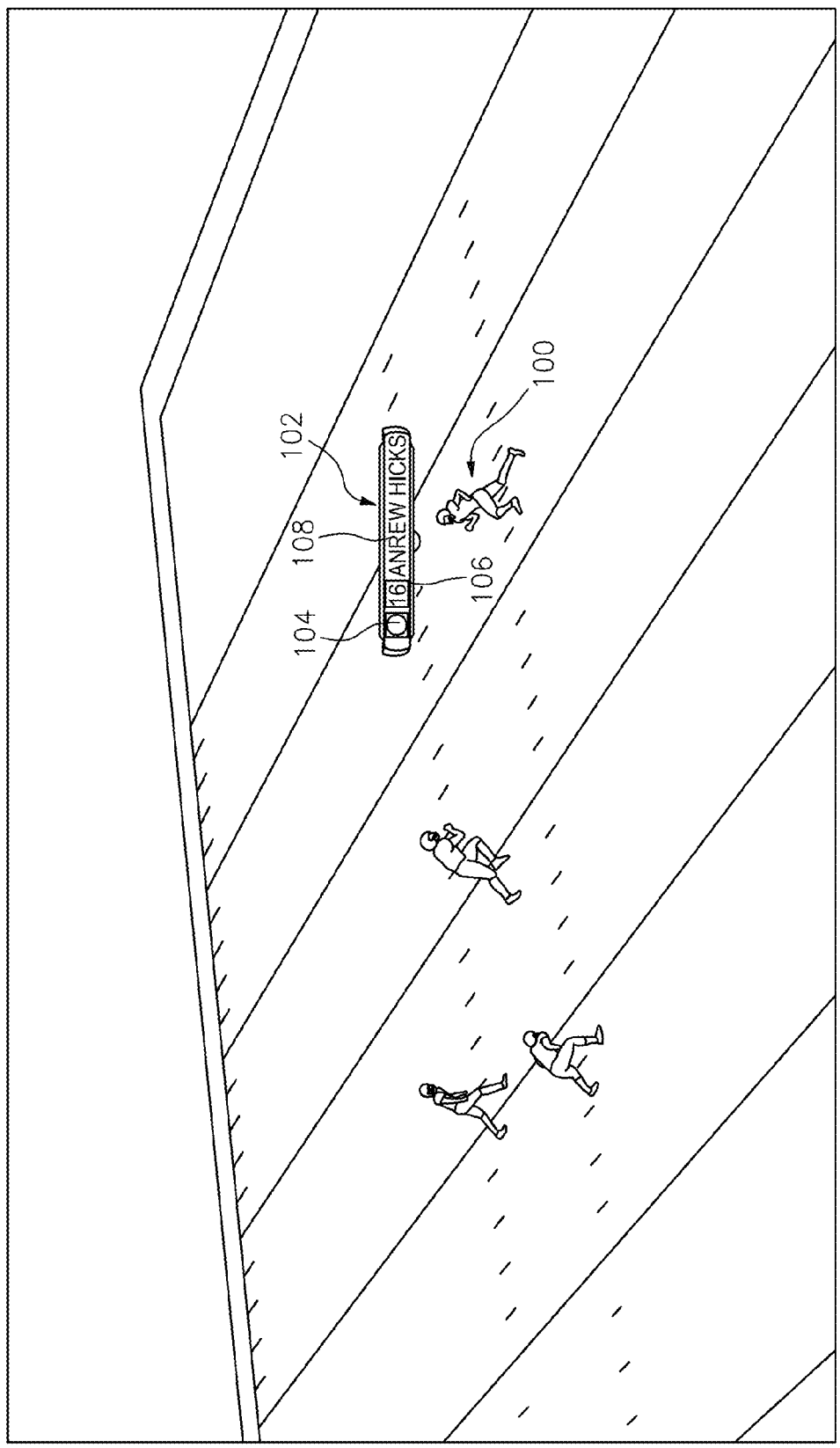
FIG. 2 is another illustration of an exemplary tracked athlete on a field of play.
Figure 3:
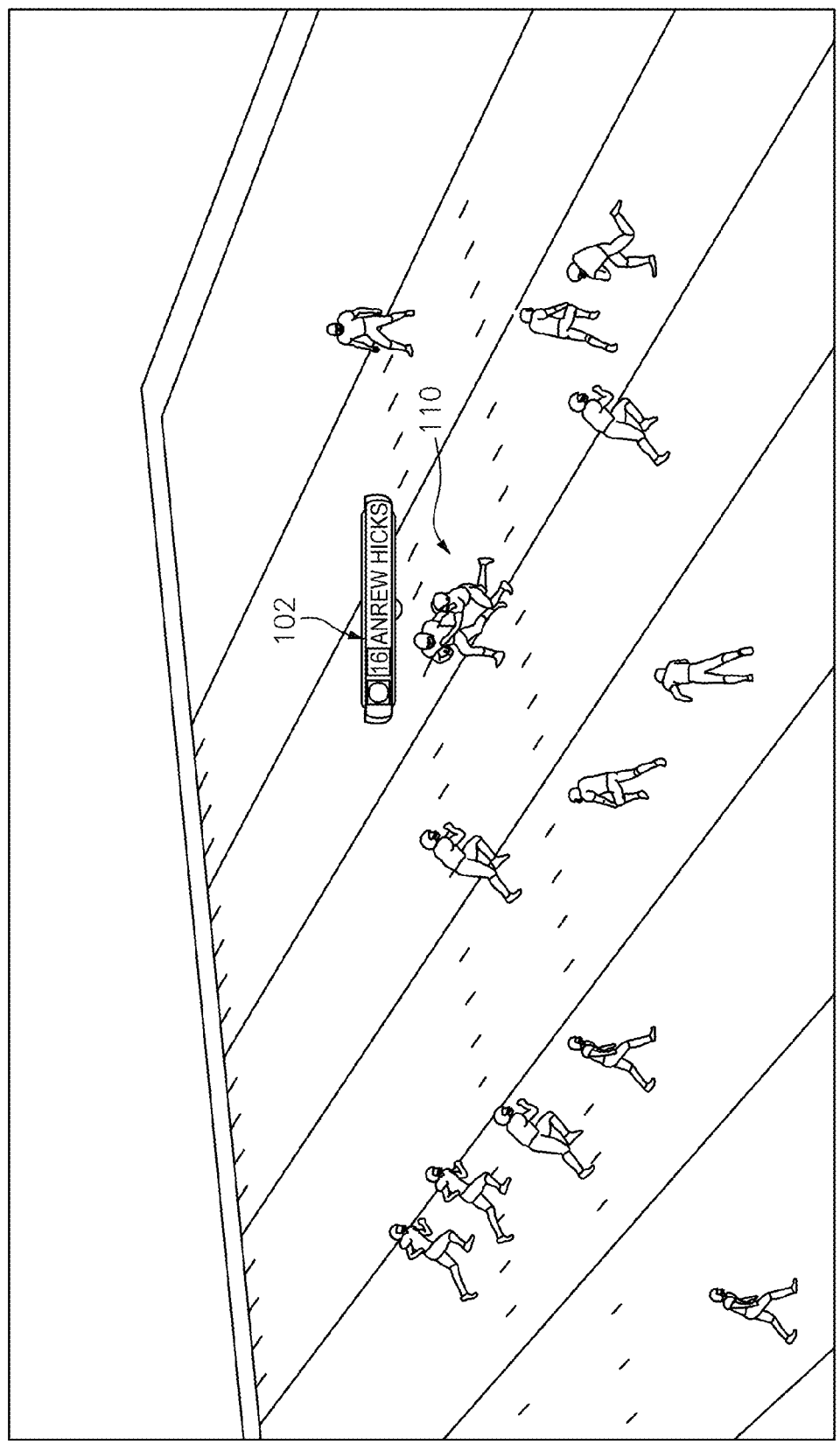
FIG. 3 is an illustration of an exemplary tracked athlete with faded statistics.

For example, FIG. 1 illustrates Andrew Hawkins, shown generally at 100, entering a right hand frame of a punt return. In this sequence, Hawkins is tracked, but the overlay, shown generally at 102, optionally only displays part of his information (since he is only just within the frame). As he moves into the frame, e.g. at FIG. 2, his information 102 is completely illustrated, in this case team 104, number 106 and name 108. At FIG. 3, we see a tackle, shown generally at 110, between ten and fifteen yards, and optionally, his information fades from the broadcast.

Figure 4:
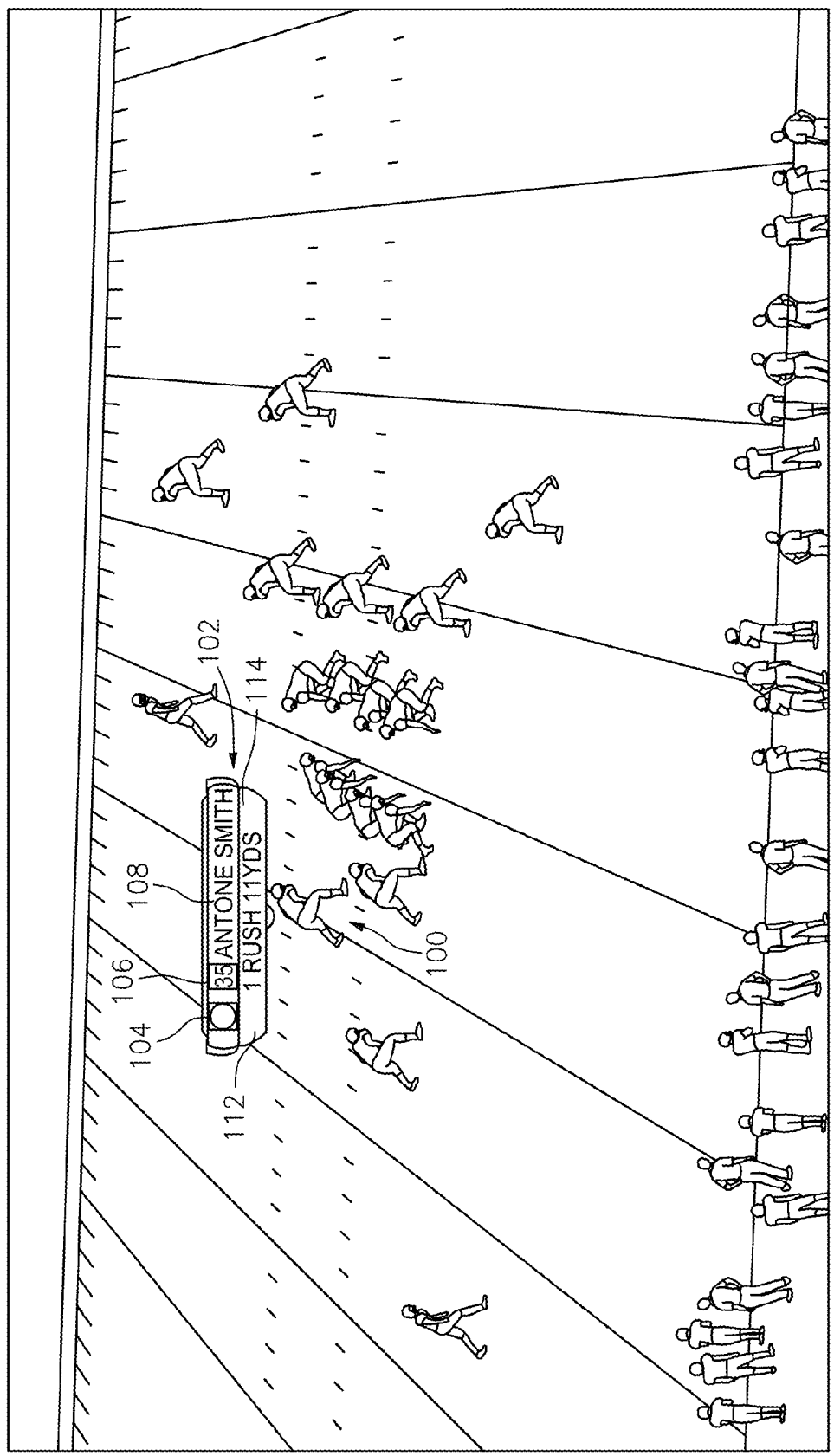
FIG. 4 is an illustration of an exemplary tracked athlete with additional player statistics.
Figure 5:
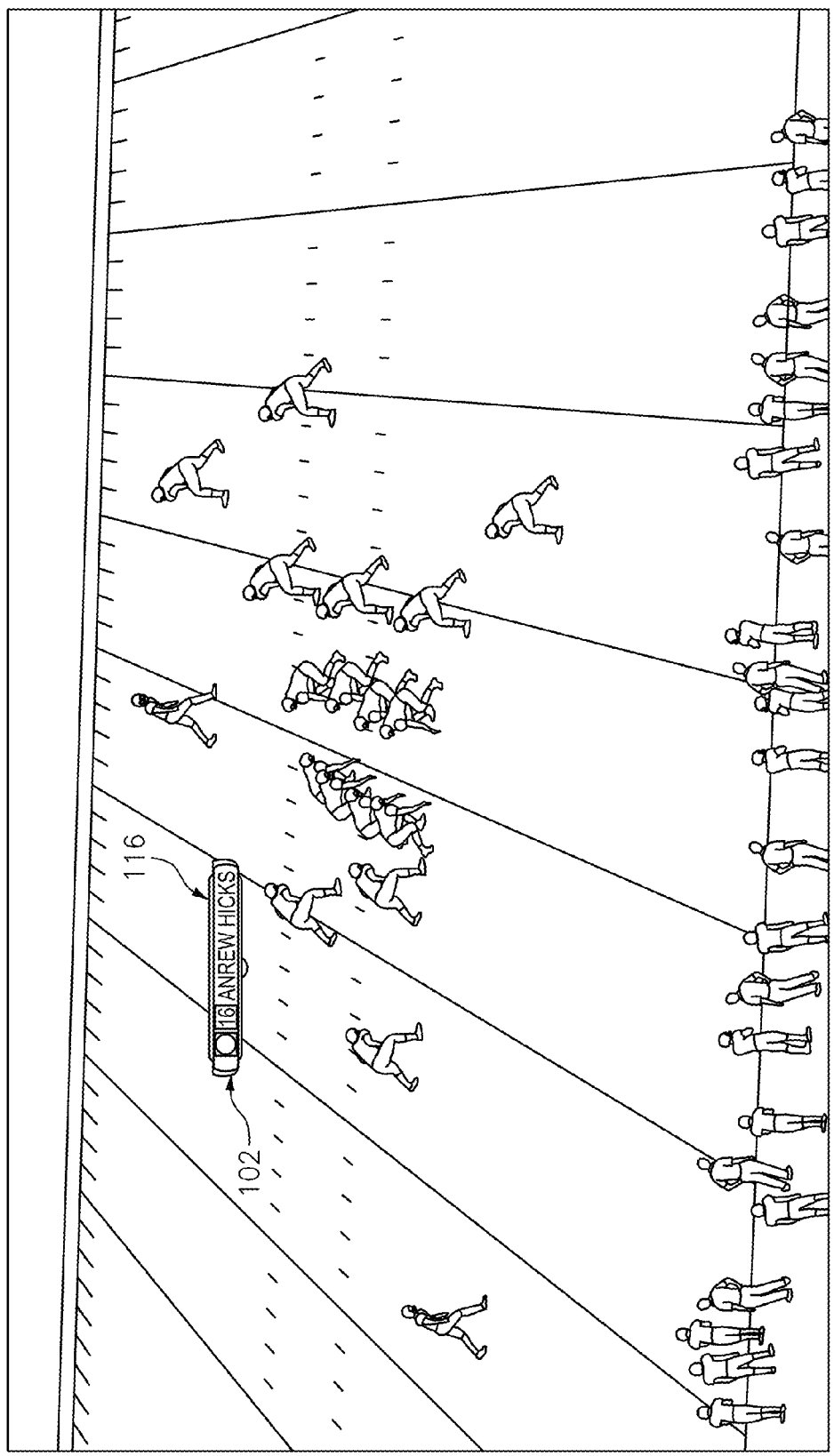
FIG. 5 is another illustration of an exemplary tracked athlete with faded statistics.

A similar example is proved at FIGS. 4-5, wherein Antone Smith 100 is shown in position on a first and ten play, without significant play (other than spreading of defense), with fully displayed information 102, in this case team 104, number 106, name 108, rushing 112 and yardage 114, followed by fade of the animation immediately prior to the action, shown generally at 116 in FIG. 5.

Figure 6:
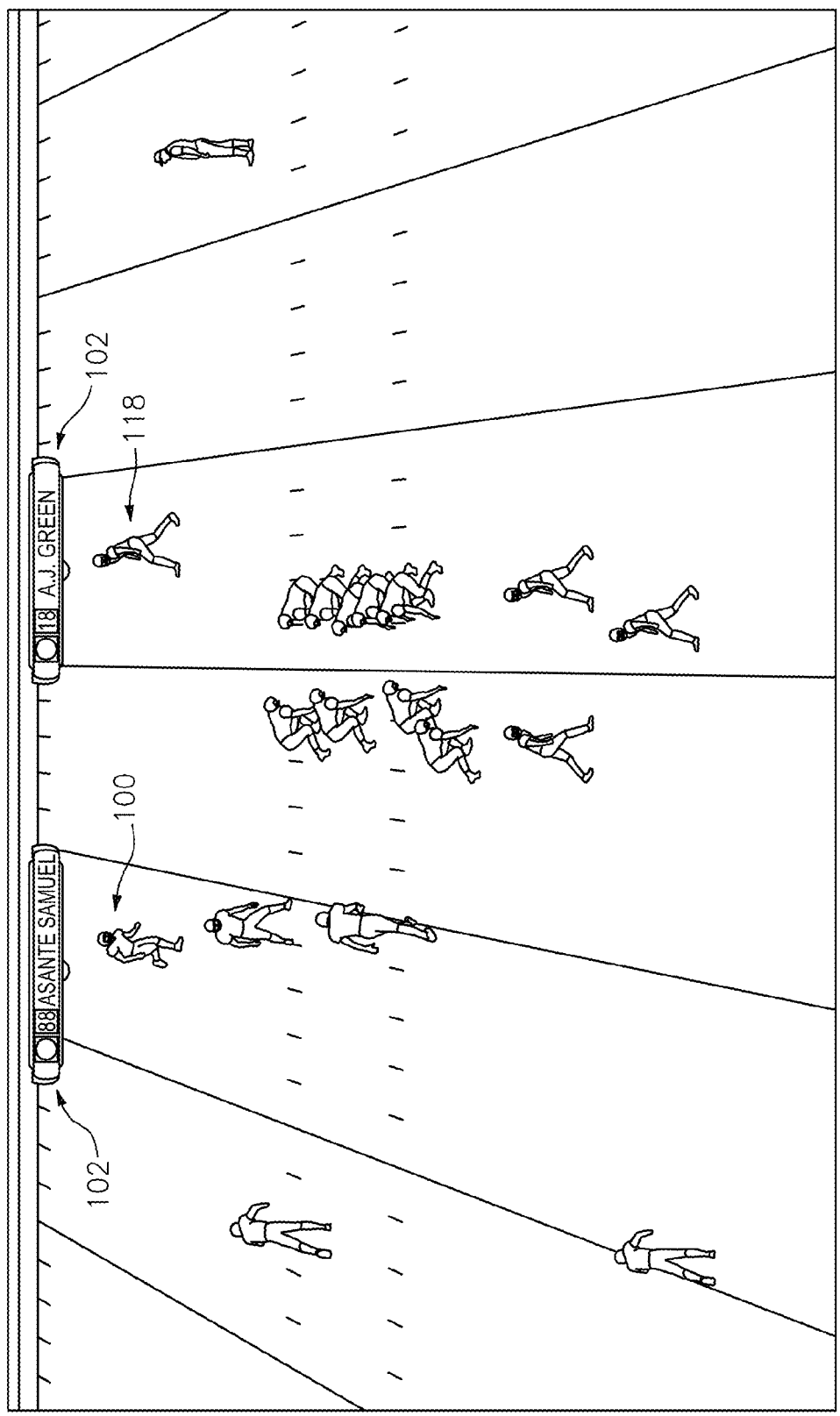
FIG. 6 is an illustration of plural exemplary tracked athletes.
Figure 7:
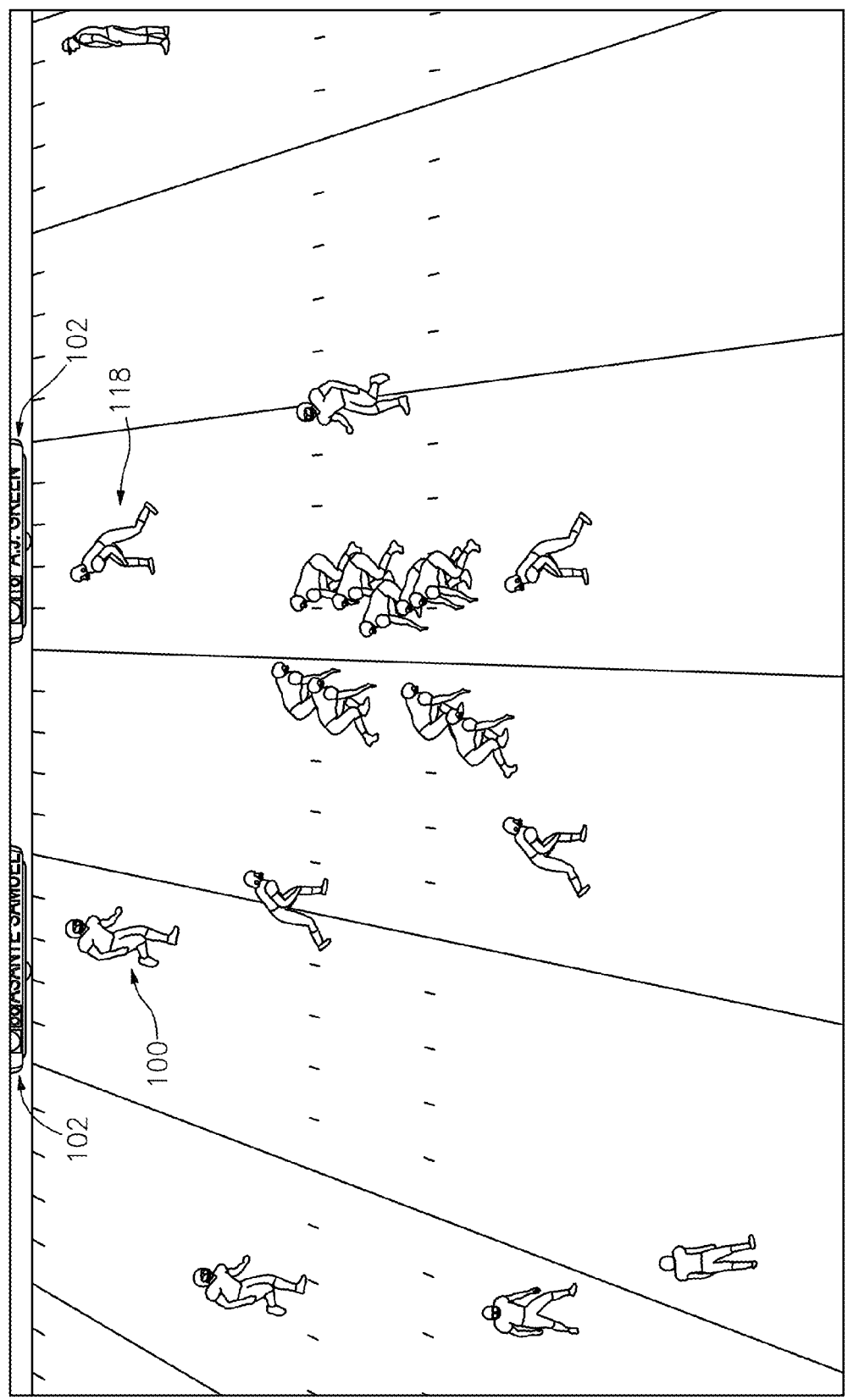
FIG. 7 is an illustration of exemplary tracked athletes with partially displayed statistics.

FIGS. 6-7 illustrate plural tracked players (in this case two), shown generally at 100 and 118, respectively, though the number of possible tracked objects (balls, lines, field marks, coaches, other marks)/players should not be limited in the present disclosure. In this case, Asante Samuel 100 and A. J. Green 118 face off, but in FIG. 7, as the broadcast image shifts, the tagged information 102 partially moves off-screen for the broadcast.

Figure 8:
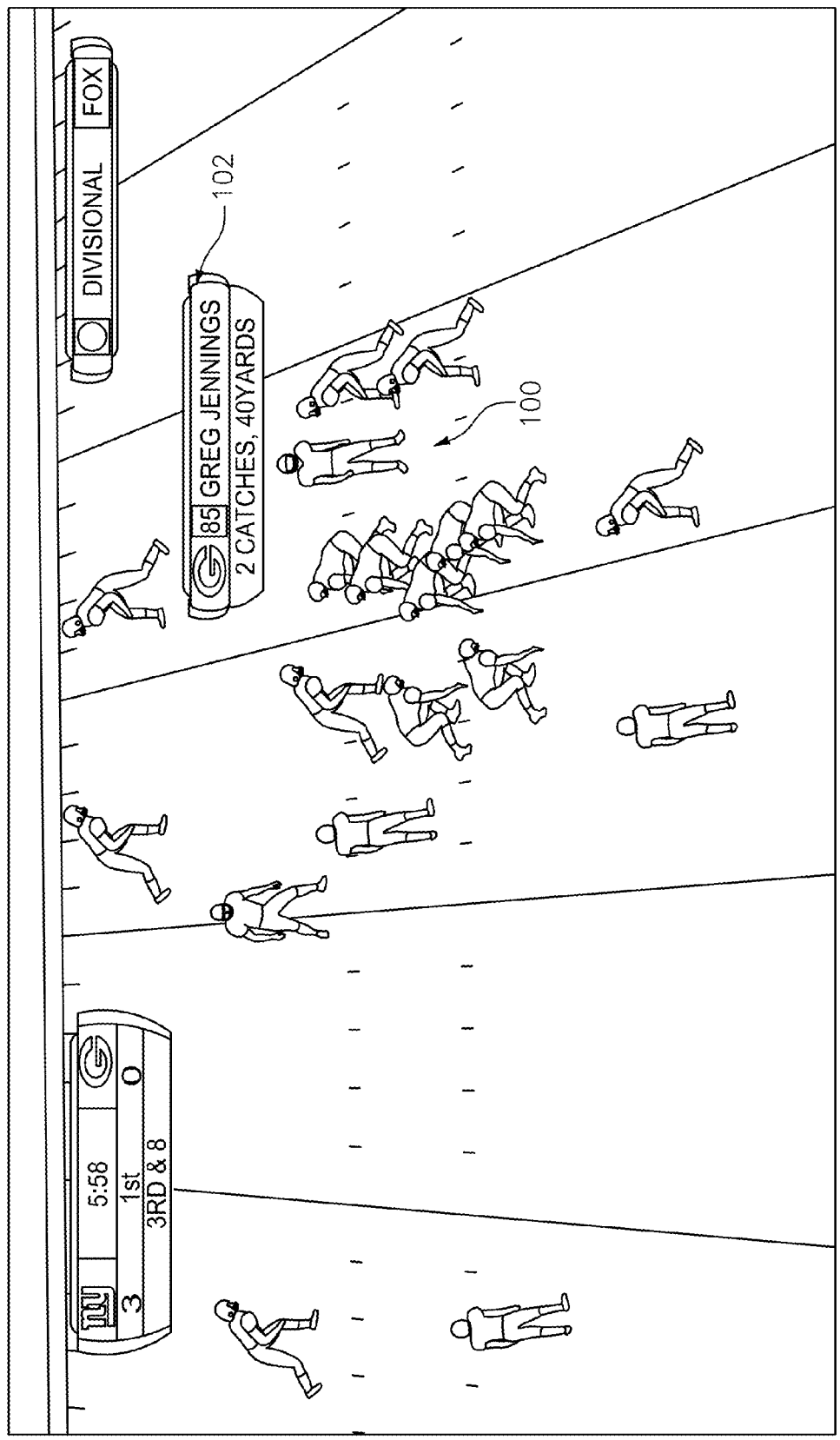
FIG. 8 is an illustration of an exemplary tracked athlete with game statistics.
Figure 9:
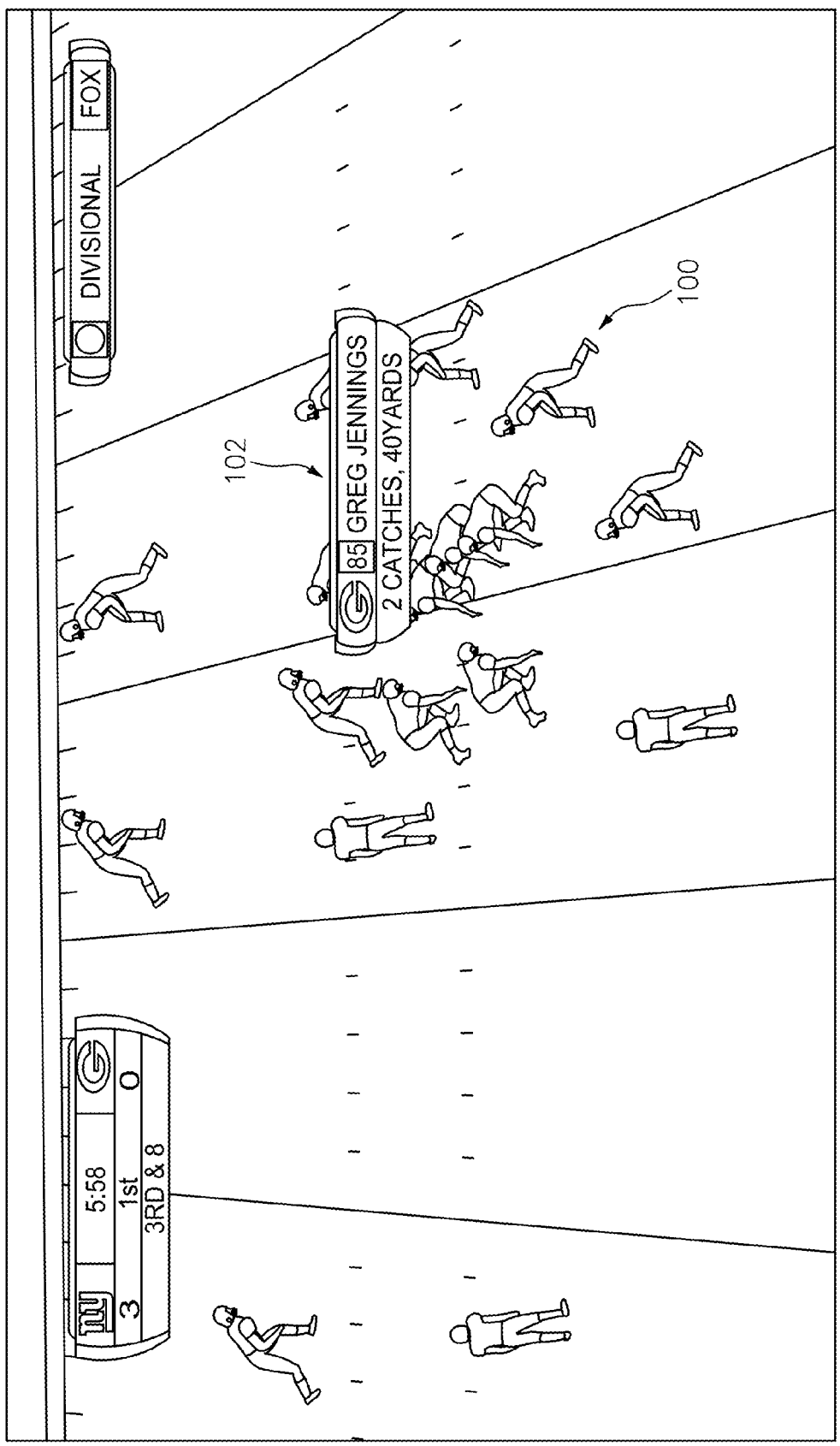
FIG. 9 is an illustration of an exemplary tracked athlete with disappearing statistics.

FIGS. 8 and 9 provide another example of tagging, wherein Greg Jennings 100 is clearly tagged at 102 in FIG. 8 during a play shift, followed by FIG. 9 at the snap with the tagged information 102 fading so as not to distract from the play.

The presently described systems and methods advantageously provide tracking of objects (e.g., players) of any number. One embodiment provides tracking of five players on each side of an event (e.g., basketball). Others provide tracking of the five for each, plus the "sixth man," i.e., certain or all of the fans, or commentator, (e.g., Dick Vitale), such that interesting events outside the actual field can be either automatically or manually recognized as potentially valuable to broadcast. An automatic identification can be related to prior recognized statistics or importance (e.g., game, series, etc. statistics, social media relevance, celebrity status, etc.).

Figure 10:
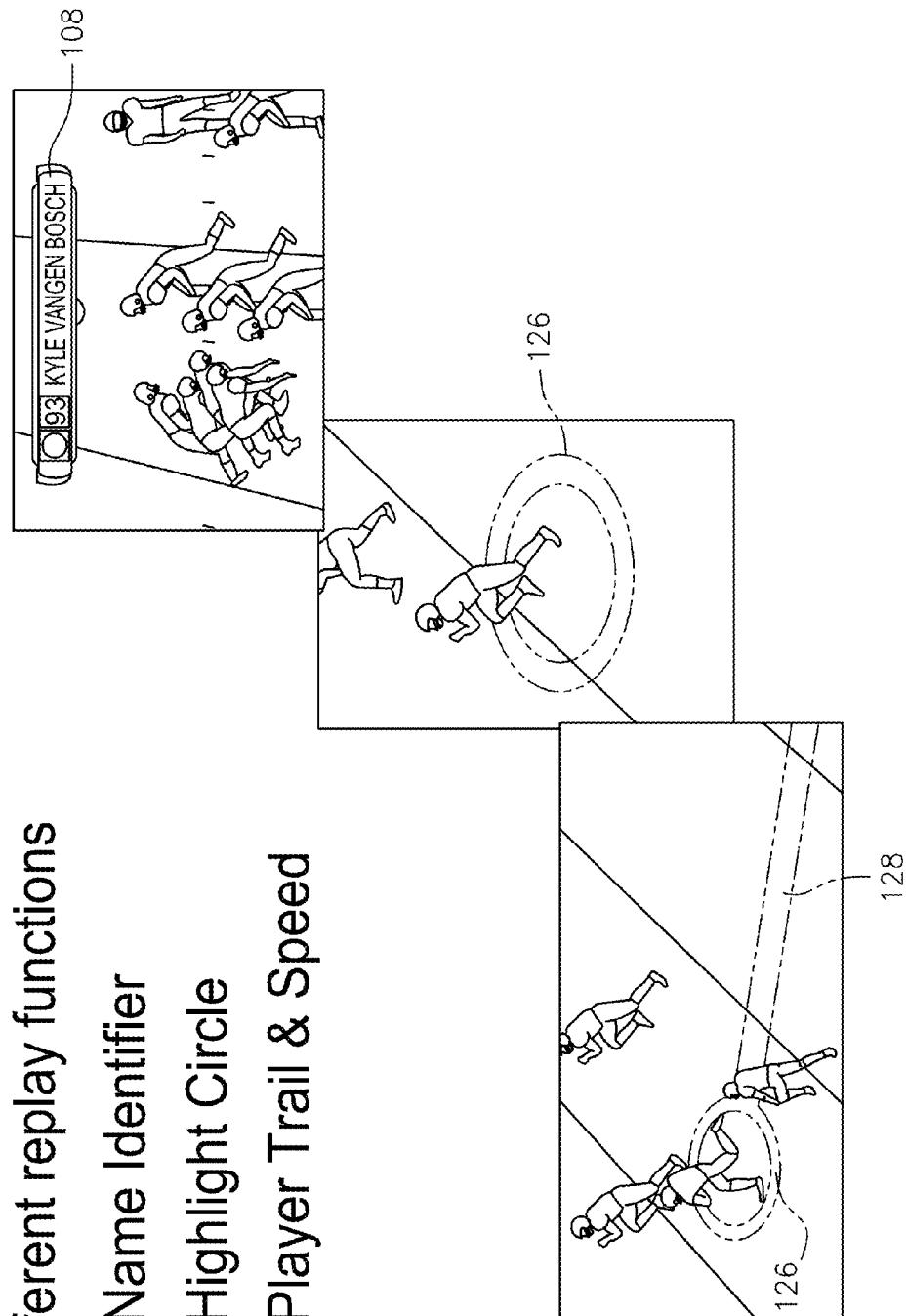
FIG. 10 is an illustration of an exemplary replay functions.
Figure 11:
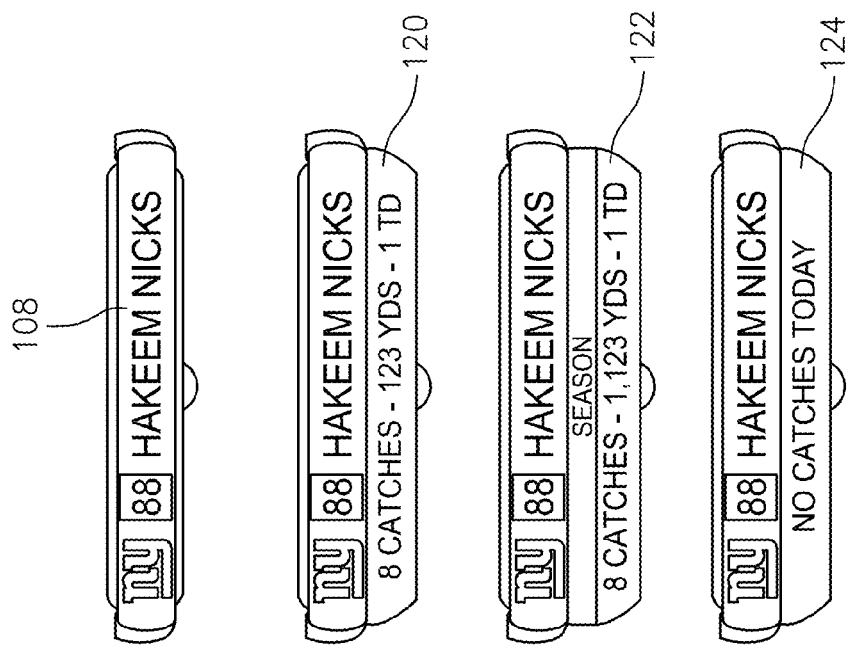
FIG. 11 is an illustration of exemplary graphic functions.

Advantageously, exemplary present systems and methods provide for plural replay functions, e.g., name identifier 108, highlight circle 126 (replay halos, which may be done post production), player trail and speed 128, as is illustrated in FIG. 10. Further, various graphic functions may be employed, as in FIG. 11 or otherwise, including, e.g., name identifier 108, in-game stats 120, season stats 122, player or coach comments and custom notes 124.

Figure 23:
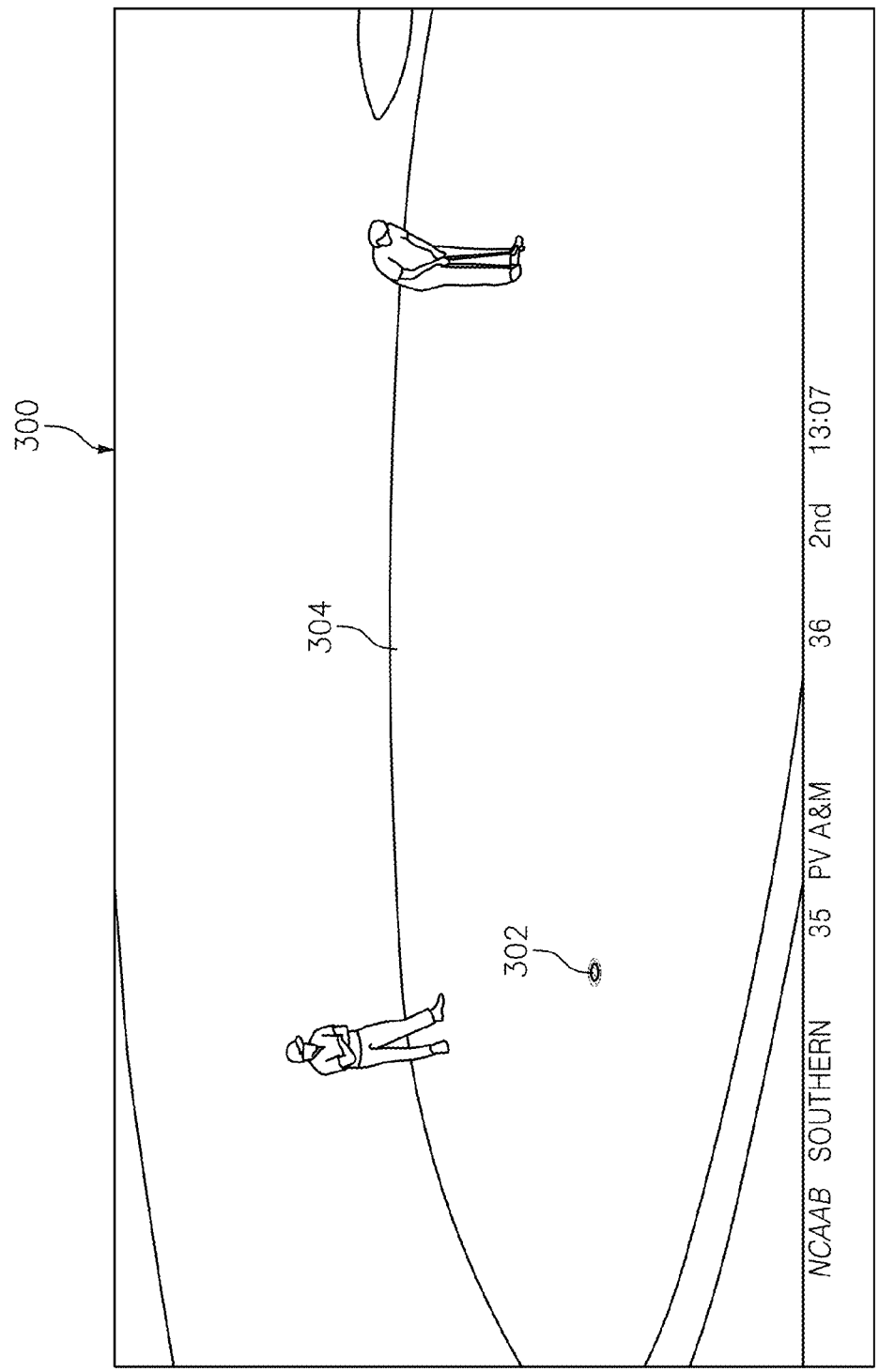
FIG. 23 illustrates an exemplary golf screenshot with highlighting.

Other exemplary embodiments are described in the context of an exemplary golf application. For example, players, golf balls, golf holes, terrain, etc., may be tracked or tagged. Such items may be highlighted or otherwise emphasized for better broadcast visibility and tracking of play. FIG. 23 illustrates exemplary highlighting of a hole 302 on a green 304 of a golf course, shown generally at 300.

Figure 24:
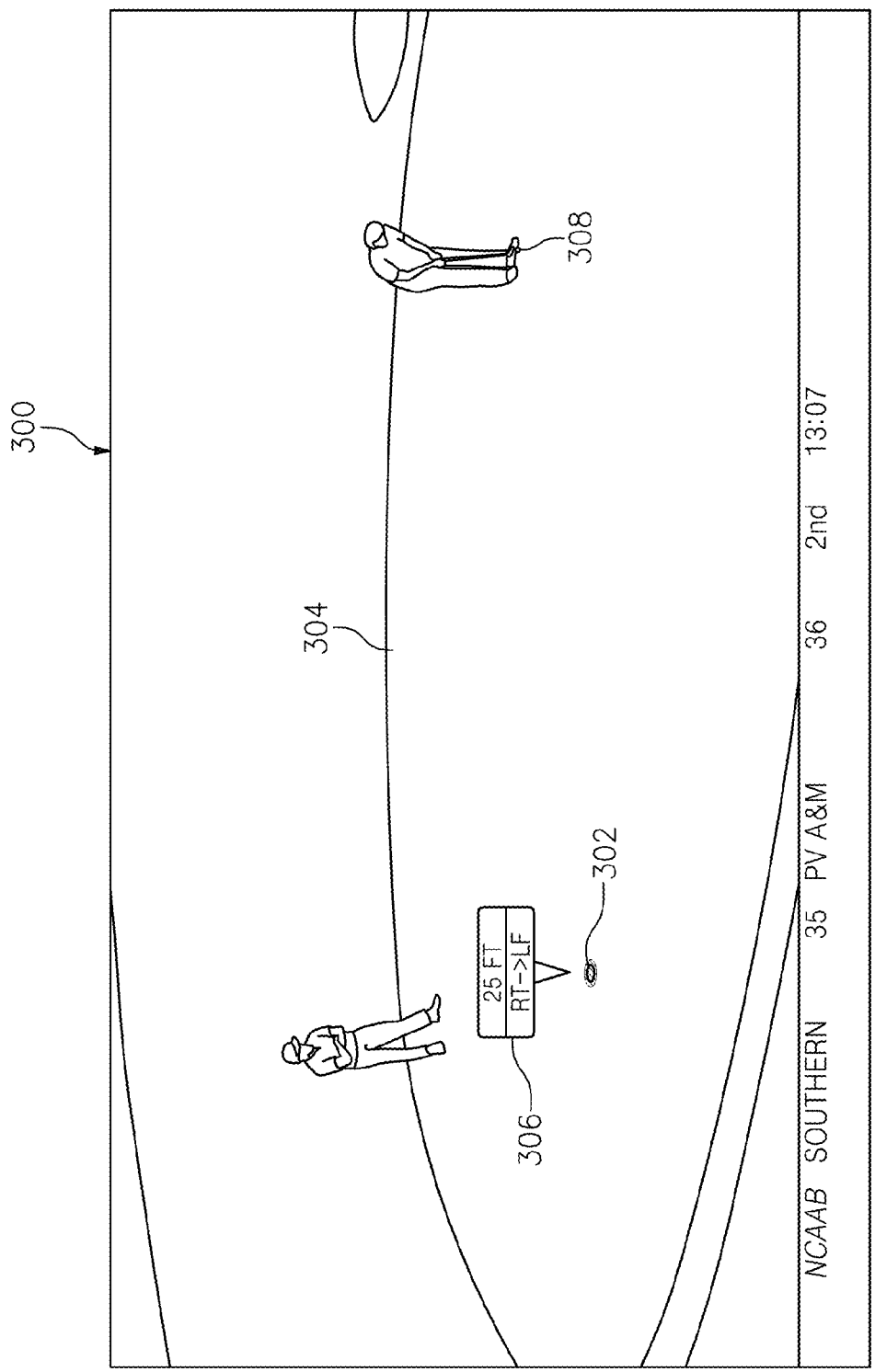
FIG. 24 illustrates an exemplary golf screenshot with highlighting and additional overlays.
Figure 25:
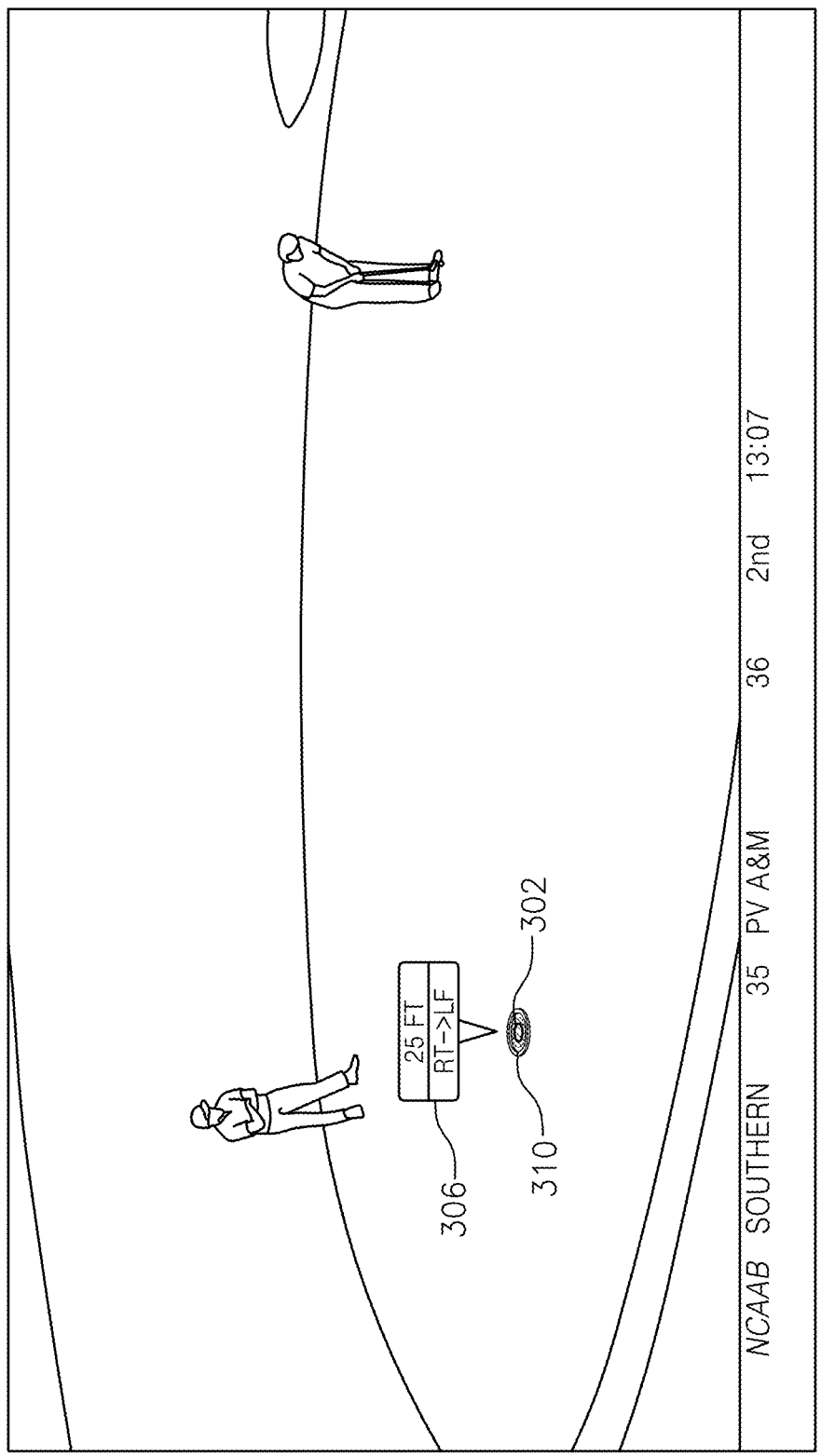
FIG. 25 illustrates another exemplary golf screenshot with highlighting and additional overlays.

Additionally, information overlays, such as rangefinder information, terrain grades or other environmental conditions, such as wind or temperature information may be provided. FIG. 24 illustrates, in addition to highlighting of a hole 302, the addition of an exemplary information overlay 306, in this case describing distance to the hole 302 from a golf ball 308, as well as information as to the terrain, in this case that the terrain breaks right to left. FIG. 25 illustrates an additional overlaid ring 310 around hole 302 for better visibility.

Figure 26:
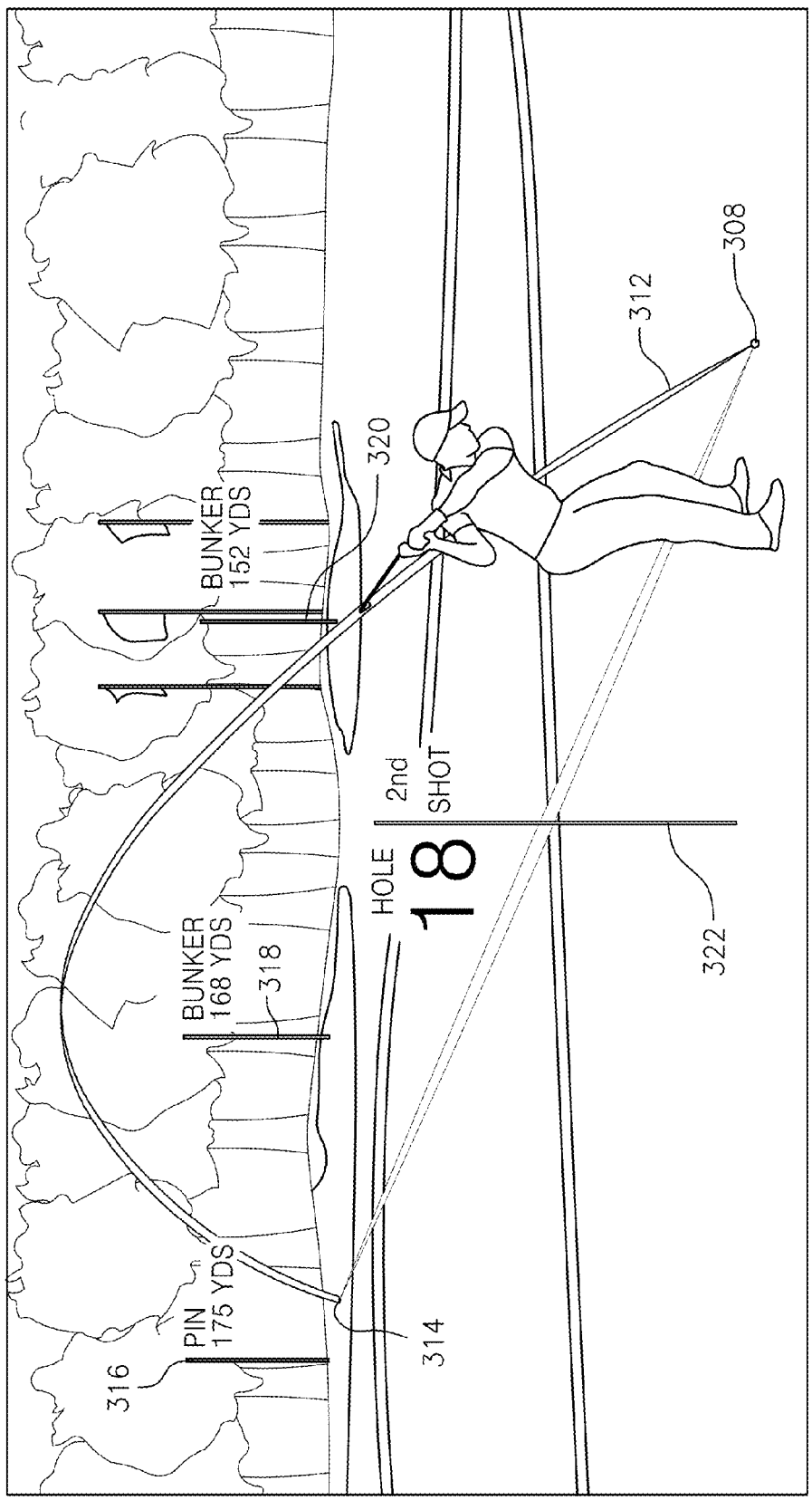
FIG. 26 illustrates an exemplary golf screenshot with range information and other overlays.

With regard to distances, in exemplary embodiments, an on-air broadcast camera can be calibrated to show distances from a golfer (or other point of interest) to regions of interest on a golf course. These distances can be pre-set or chosen live on-air to highlight something specific. FIG. 26 illustrates a projected trajectory 312 from the ball 308 to the pin 314 as well as information overlays with identification and distances from the ball 308 to the pin and two bunkers, shown generally at 316, 318 and 320. FIG. 26 also shows an information overlay 322 indicating the hole number and stroke count.

Figure 27:
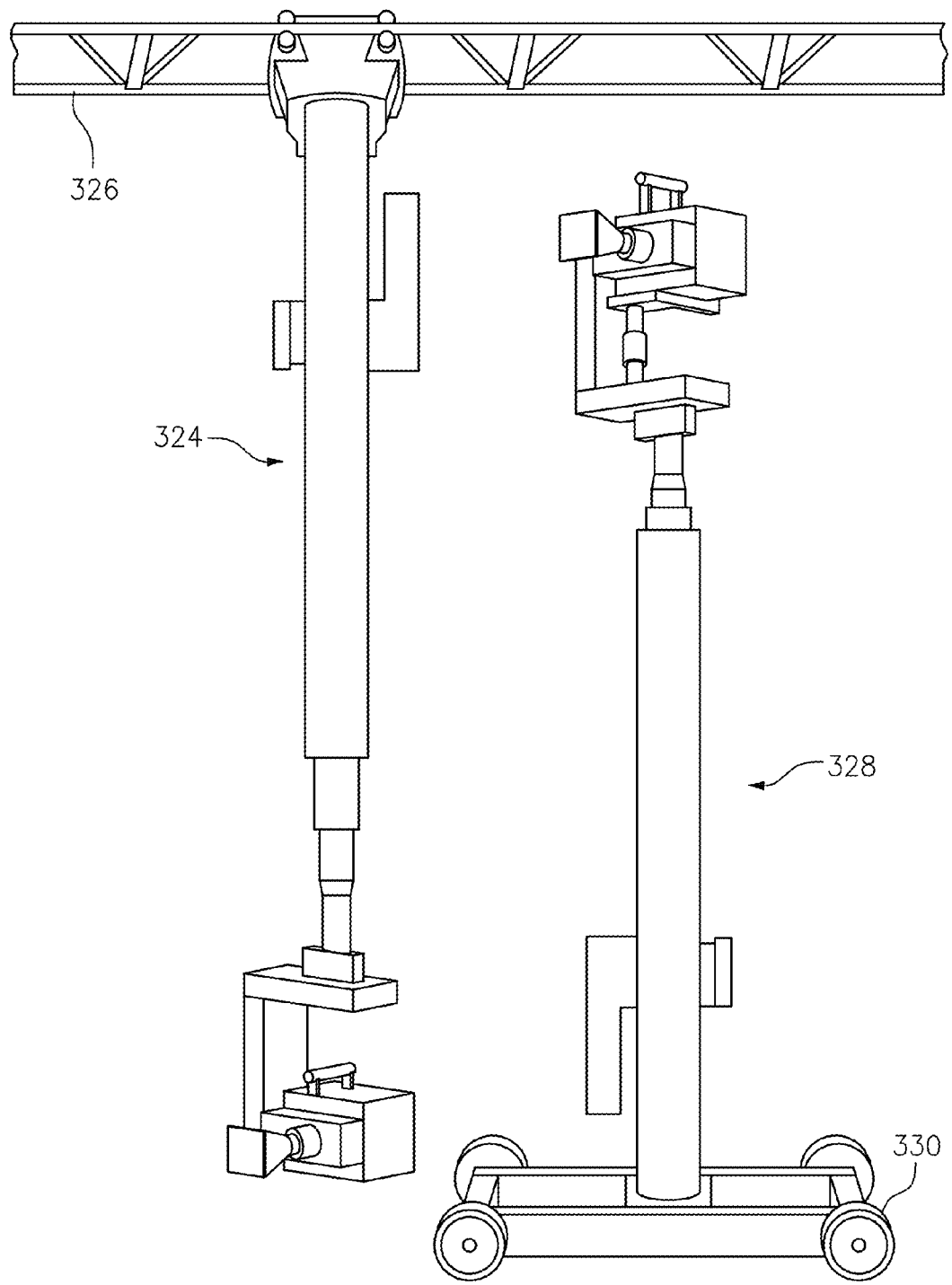
FIG. 27 illustrates an exemplary camera system.

In other exemplary embodiments, alternate views, such as ball path or trajectory views may also be shown or artificially generated and overlaid or substituted for primary feeds, or provided as second screen views. Exemplary views include virtual flyovers, with or without player shots, which may be dynamically or manually plotted. Tracking may be assisted with GPS, radar, plural cameras (including elevated cameras, drones, high contrast cameras, etc.), and/or references tied to or associated with particular courses or course portions, among others. FIG. 27 illustrates exemplary fairway cameras, with a first camera 324 being suspended from an overhead track 326 and a second camera 328 movable via wheels 330.

Figure 28:
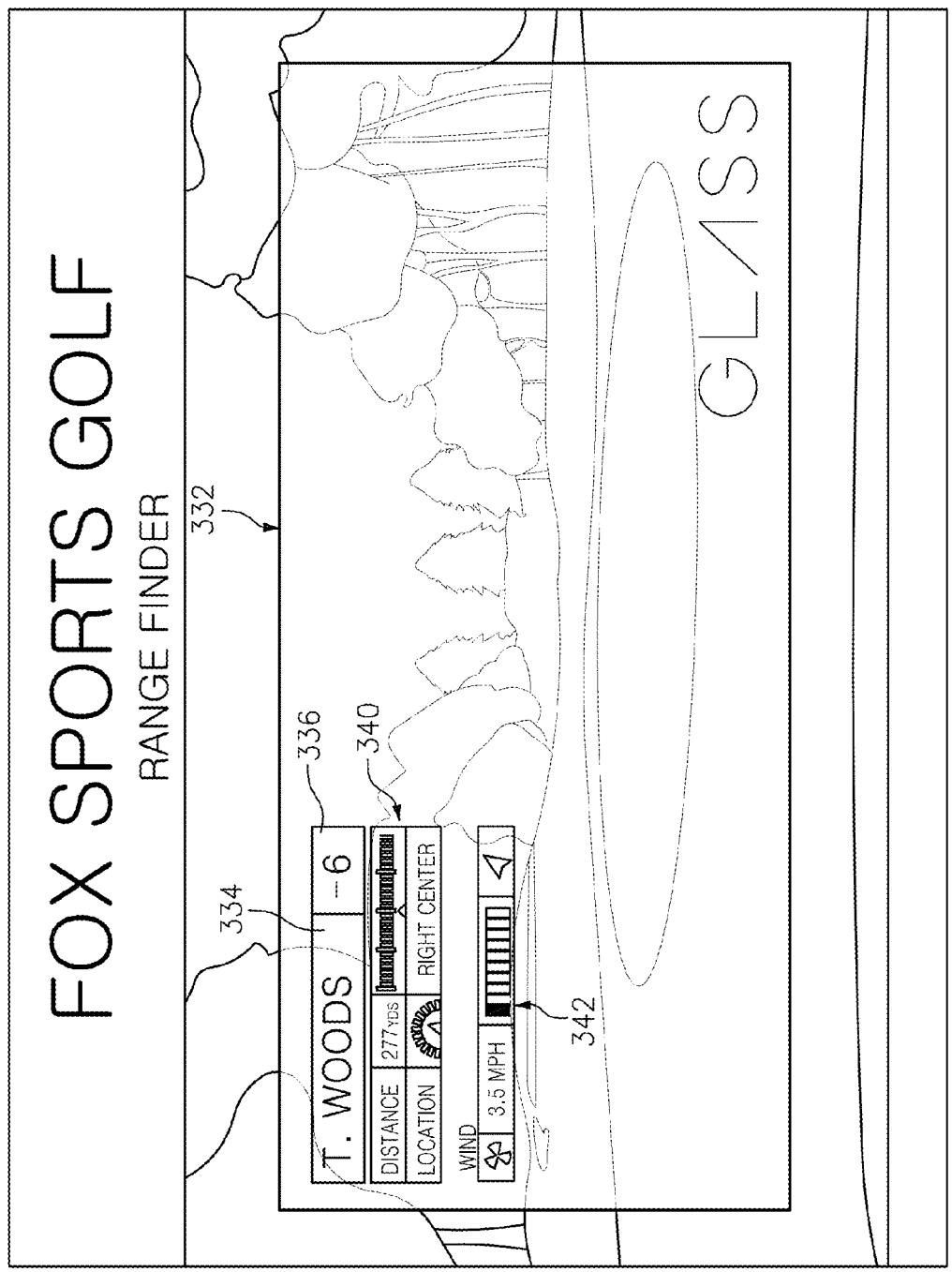
FIG. 28 illustrates an exemplary golf screenshot with range and environmental information.

FIG. 28 illustrates an exemplary embodiment of an information overlay 332 such camera(s) or other equipment can provide, in this embodiment including player name 334, stroke count 336, distance to the pin 338, location on the fairway (shown generally at 340 in differing formats), and environmental factors, such as wind (shown generally at 342 in differing formats).

As we have noted, terrain, golf holes, etc. may be tracked and tagged. Further, tracking may include references tied to or associated with particular courses and course portions. Additionally, we have noted that overlay information may be generated from specific animators, operators, coaches, players, etc.

In exemplary embodiments, an expert's input (e.g., a golf professional) is provided as a graphical overlay on a golf course indicating desirable and/or undesirable portions of terrain (e.g., portions of a fairway, green, etc.). For example, such a golf professional may identify on a given golf course hole good and/or bad spots to land a ball from a tee shot, taking into account objective and optionally subjective factors (including e.g., places that might leave a golfer in an adverse position in considering a following shot). In exemplary embodiments, "good" and "bad" places could be shown as a graphical overlay, e.g., with green and red zones, respectively.

Figure 40:
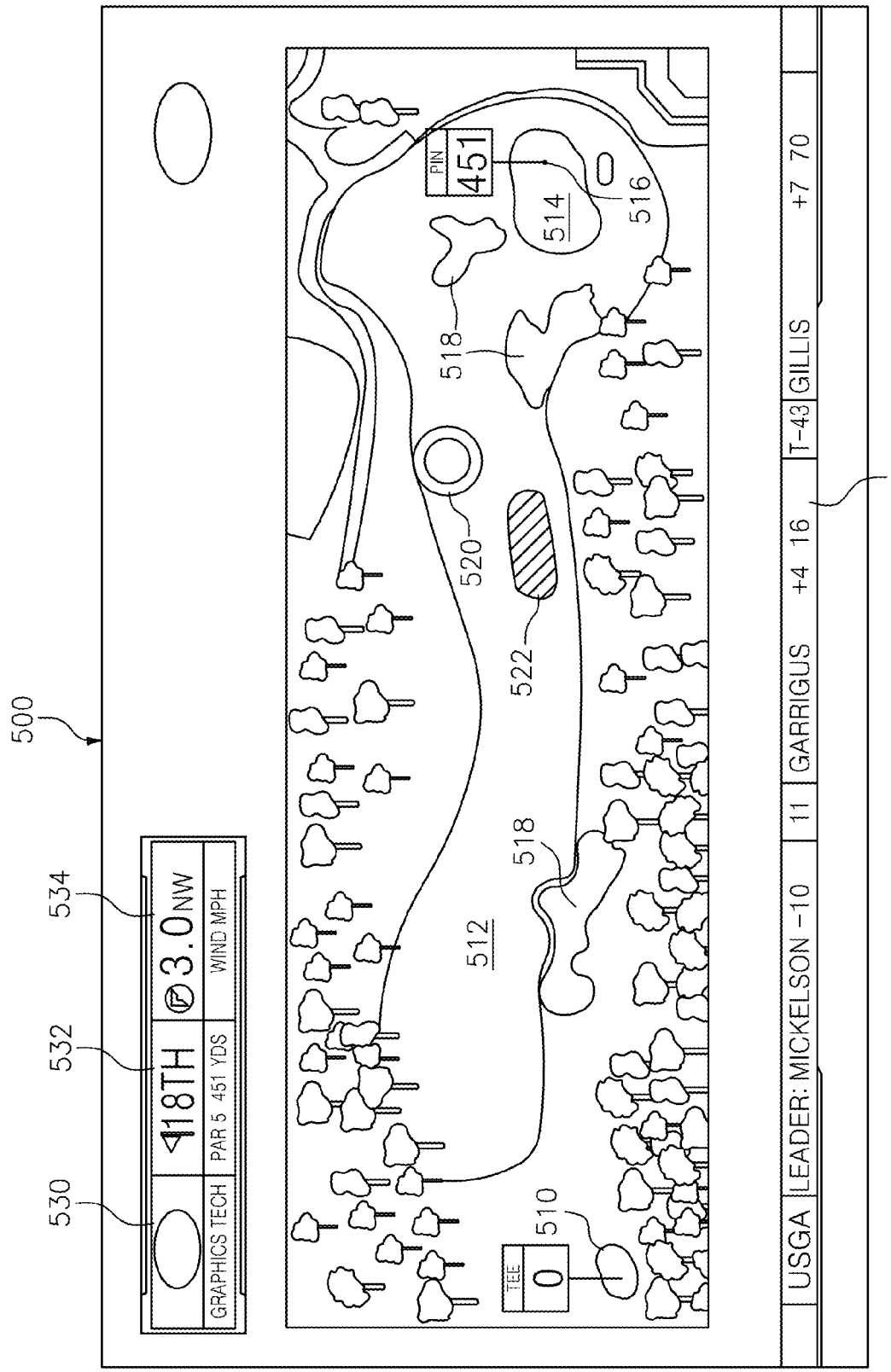
FIG. 40 illustrates an exemplary broadcast frame with plural lie zones indicated thereon.

For example, FIG. 40 illustrates an exemplary golf hole broadcast image, shown generally at 500, showing exemplary aspects of a golf hole, for example, a tee-off area 510, a fairway 512, a green 514 with a pin 516 and various bunkers 518. FIG. 40 also illustrates various exemplary banner information, for example the station identifier banner 530, the hole identifier banner 532, the wind condition banner 534 and the player board banner 536. In relevant part, this exemplary embodiment illustrates at least one, and in this case two, zones according to desirable lies.

In FIG. 40, a first zone 520 illustrates (for example in green) a desirable lie from a tee shot. As is illustrated any illustrated zone may also designate levels of desirability, in this exemplary case, shown as concentric circles, with inner circles being more desirable. However, other representations of more or less desirable lies within any given zone may be utilized, for example and without limitation non-uniform concentric shapes, alpha-numerical designators, target indicators, etc.

Referring again to FIG. 40, a second zone 522 illustrates (for example in red) a non-desirable lie, in this case utilizing hash lines across an entire shape. However, as above, various levels of desirability may also be illustrated within any given zone. Further, these zones may adjust or shift, in real time or periodically, according to players or conditions, e.g., as wind effects change during play.

Figure 41:
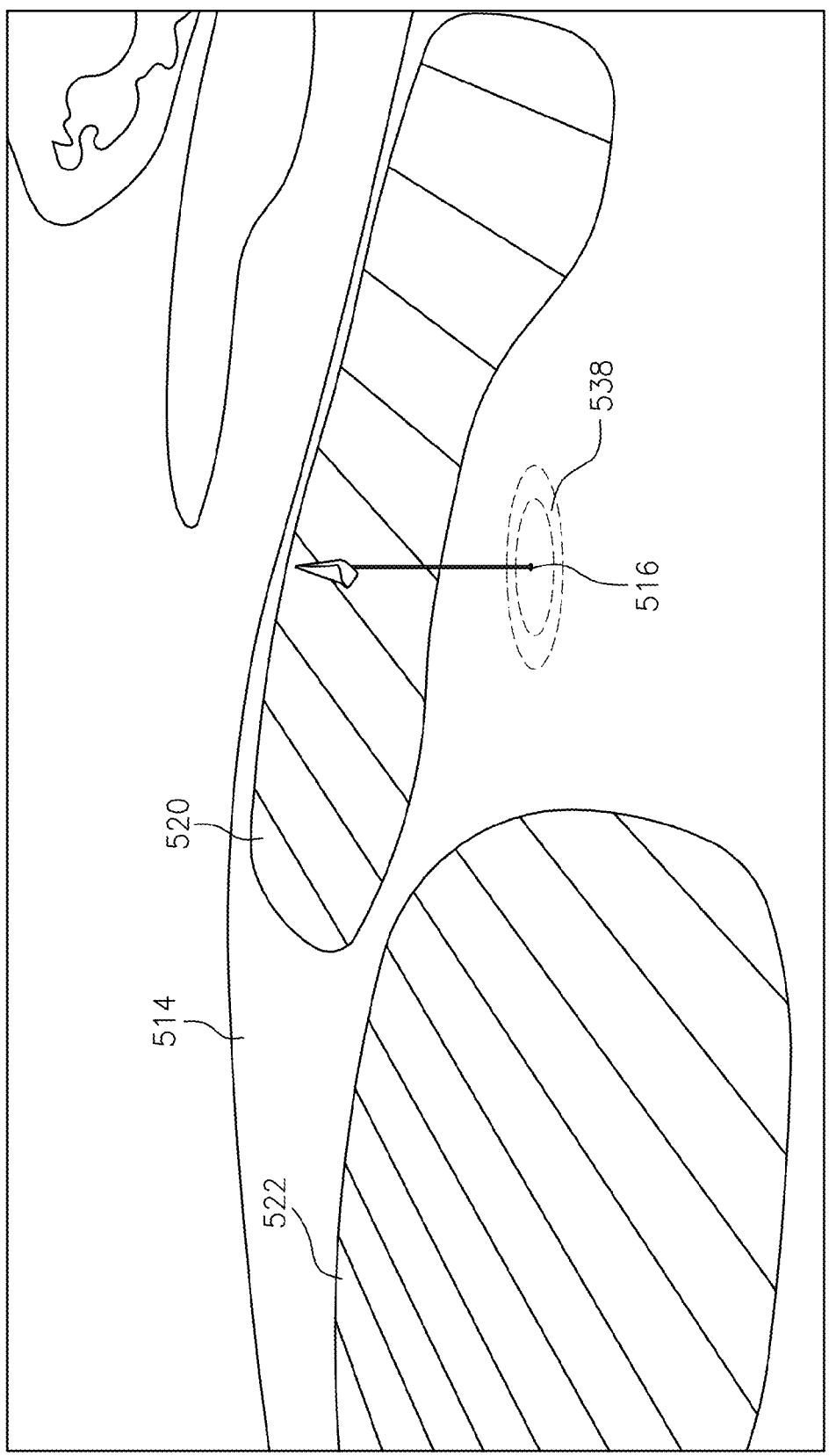
FIG. 41 illustrates an exemplary green with hole highlighting as well as indications of desirable or less desirable zones.
Figure 42:
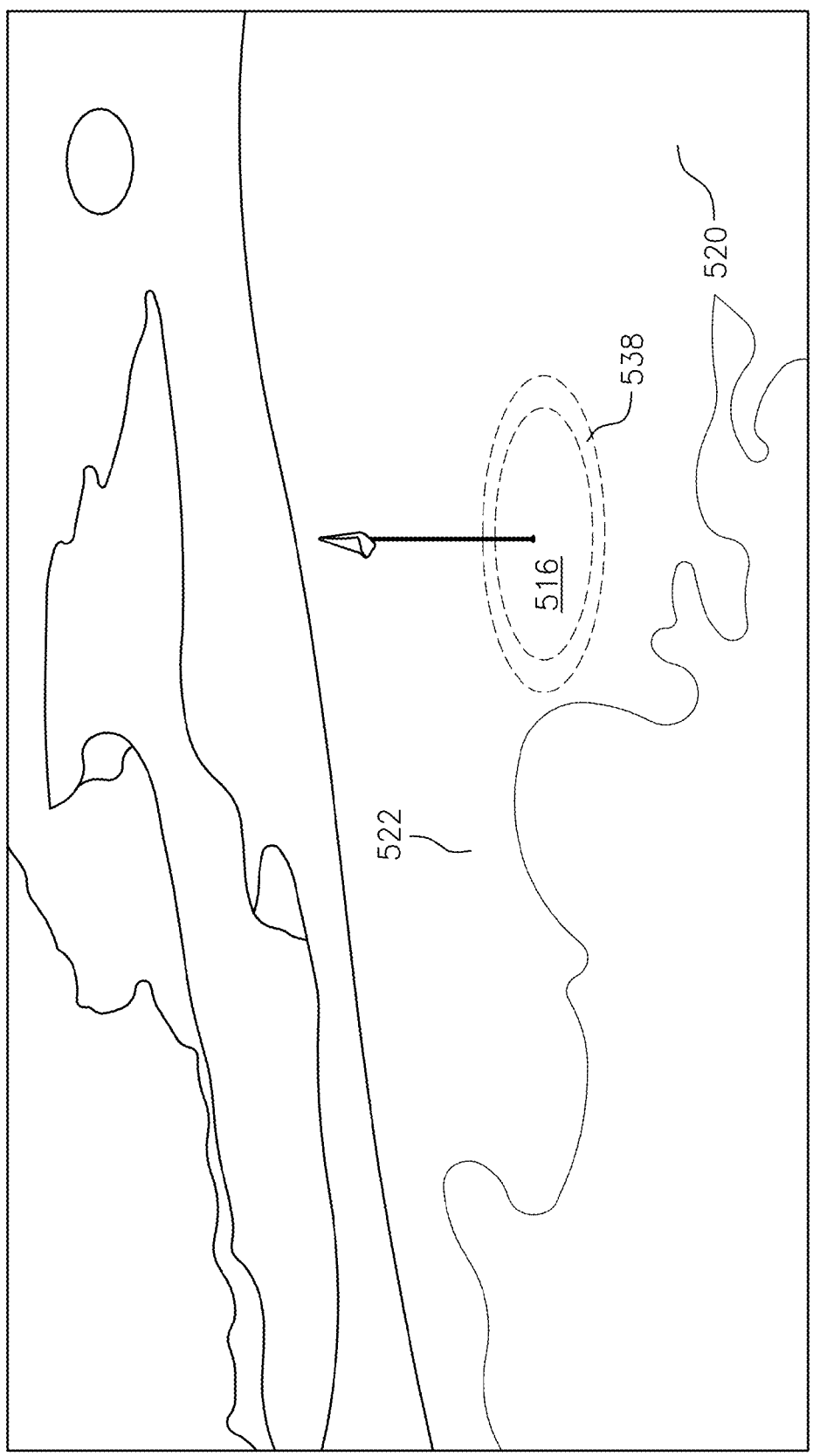
FIG. 42 illustrates another exemplary green with hole highlighting as well as indications of desirable or less desirable zones.

FIG. 41 illustrates an exemplary green 514, with a pin 516 and pin highlight indicator 538 with a first 520 and second 522 zone indicated thereon. This FIGURE also underscores the teachings herein that multiple aspects described herein may be combined, in this case, hole highlighting and zone indication. FIG. 42 illustrates another exemplary combination, with hole highlighting (in this case with variable density shading, along with zone indication.

Figure 43:
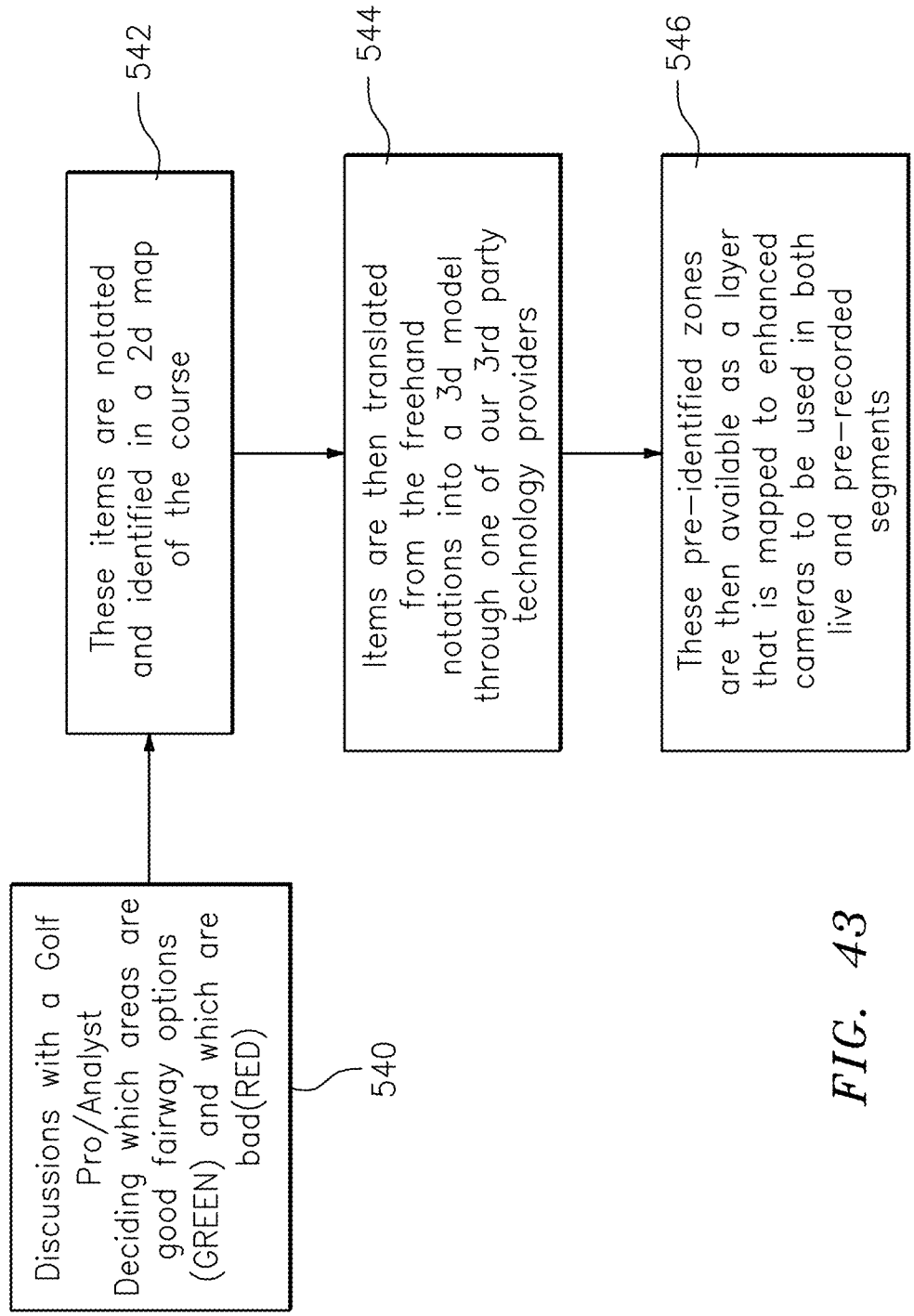
FIG. 43 illustrates an exemplary flow chart for implementing overlays indicative of more or less desirable zones.

FIG. 43 illustrates an exemplary flowchart, with input by an expert, analyst, etc., notation and/or overlay on a map, in general. FIG. 43 further indicates a more specific contemplated embodiment, including: at box 540, discussions with a golf pro/analyst wherein such decides which areas are good fairway options (for a good zone, e.g., green) and which are bad (for a less desirable zone, e.g., red); at box 542, notations and identification of such information in a two-dimensional map of the course; at box 544, translation of such (e.g., freehand notations) into a three-dimensional model, possibly pulled from a third party technology provider, among other sources; and at box 546, providing such pre-identified zones as a layer that is mapped to enhanced cameras for availability with live and pre-recorded segments.

The above also indicates that representations, maps, etc. of any golf course, hole, green, etc., may be acquired in any number of ways or pulled from any number of sources. In one exemplary embodiment, a golf professional would look over the mapped terrain and assign such "good" and "bad" places (e.g., on a hole by hole basis, among others). These assigned places could be any size or shape, as desired, in order to take into account varying factors such as length of the preceding shot, anticipated conditions of the terrain, time of day, lighting, wind conditions, physical capabilities of players, contestant skill sets, etc. Further, these places may be updated based upon change to any factors, such as condition of the terrain, characteristics of any given player, environmental conditions, unanticipated hazards, etc.

In exemplary embodiments, indications of such places may be entered by the professional using a user interface, e.g., a tablet or other mobile device, or by another editor or operator. In exemplary embodiments, a user inputs such data on a 3D rendering of a course from a course map. Further exemplary embodiments, provide a 3D rendering of a course from specific pre-determined camera shots (from the vantage points of those cameras), with the information overlaid relative thereto.

Figure 29:
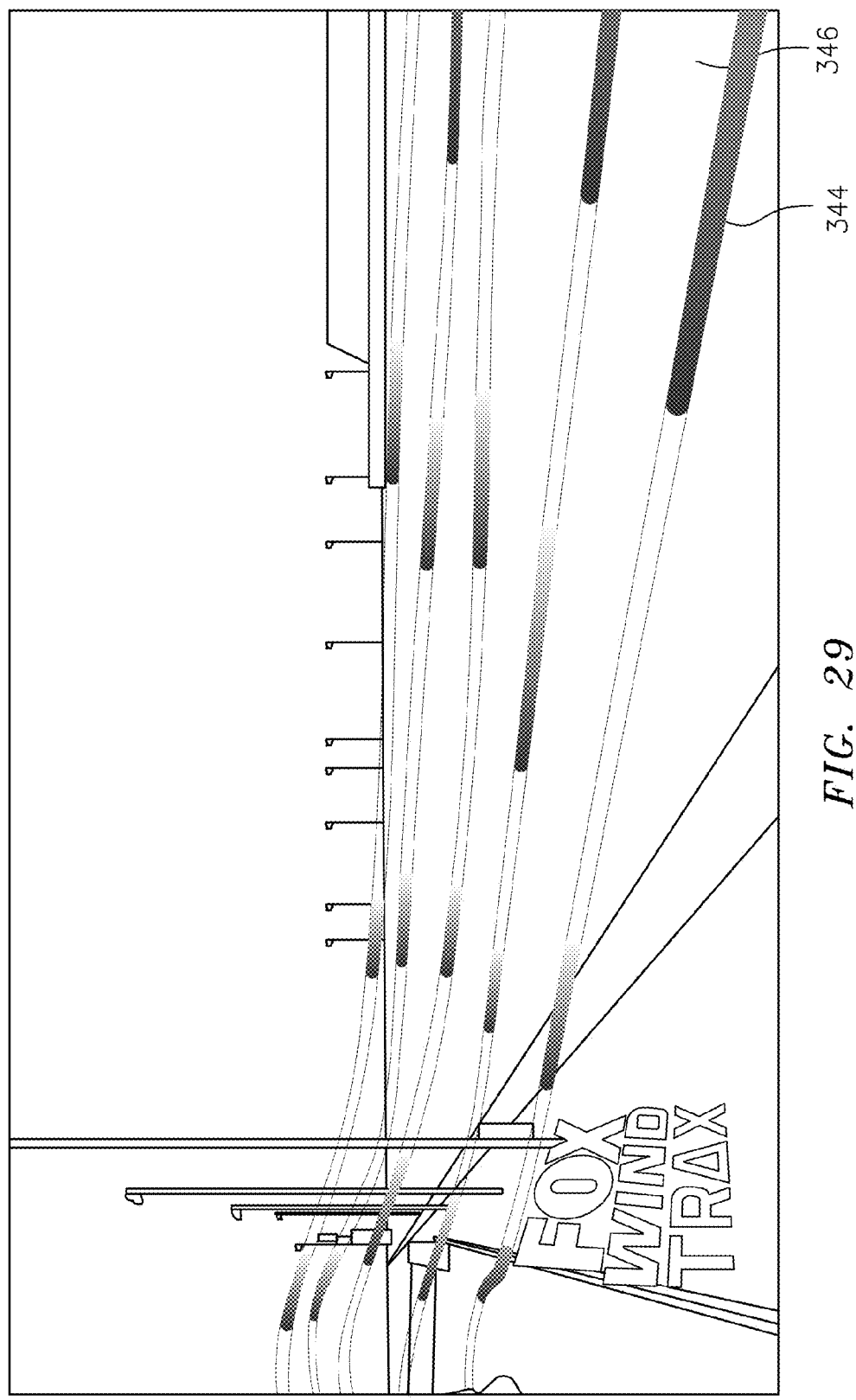
FIG. 29 illustrates an exemplary racing screenshot with wind overlays.
Figure 30:
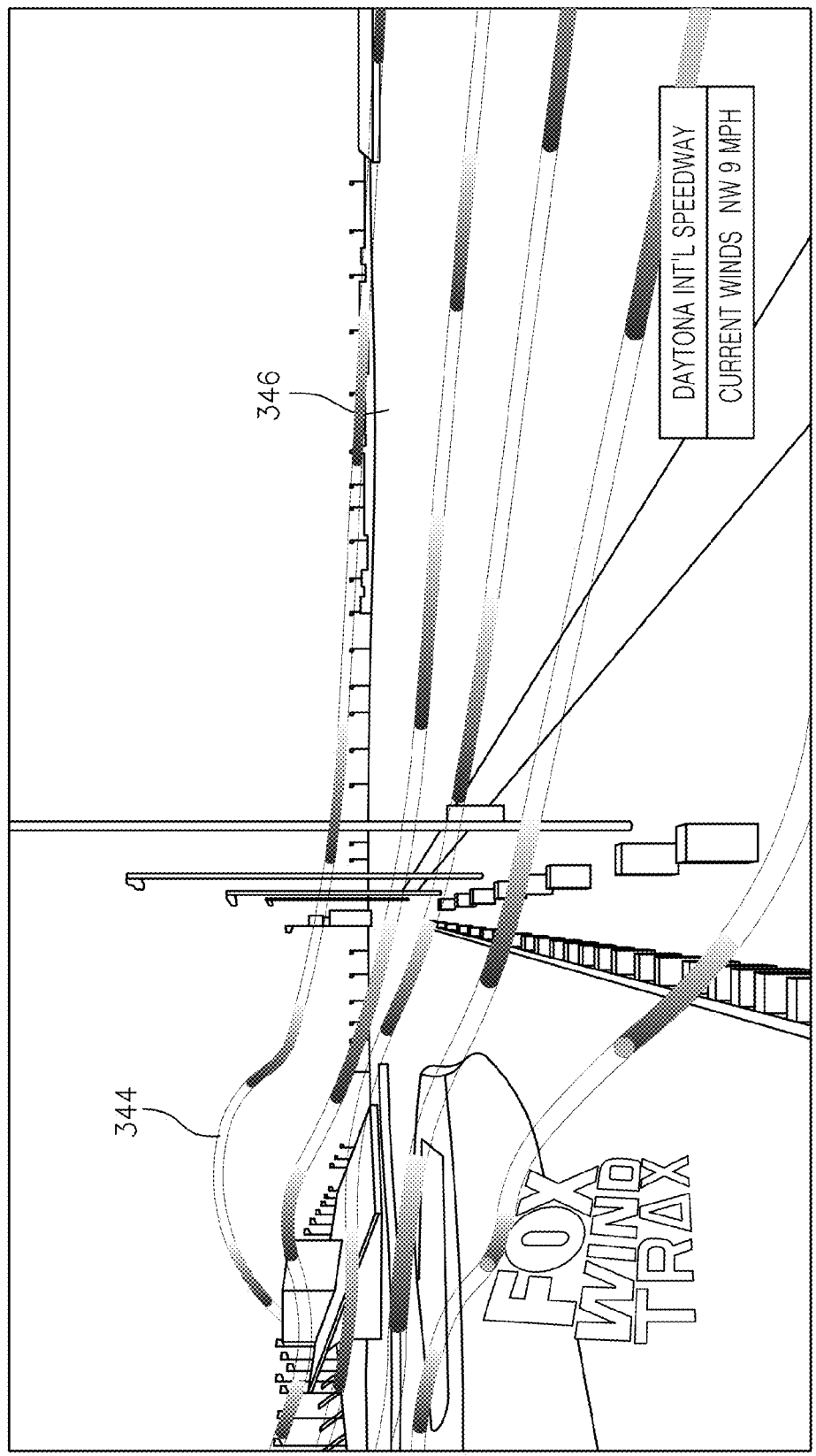
FIG. 30 illustrates another exemplary racing screenshot with wind overlays.
Figure 31:
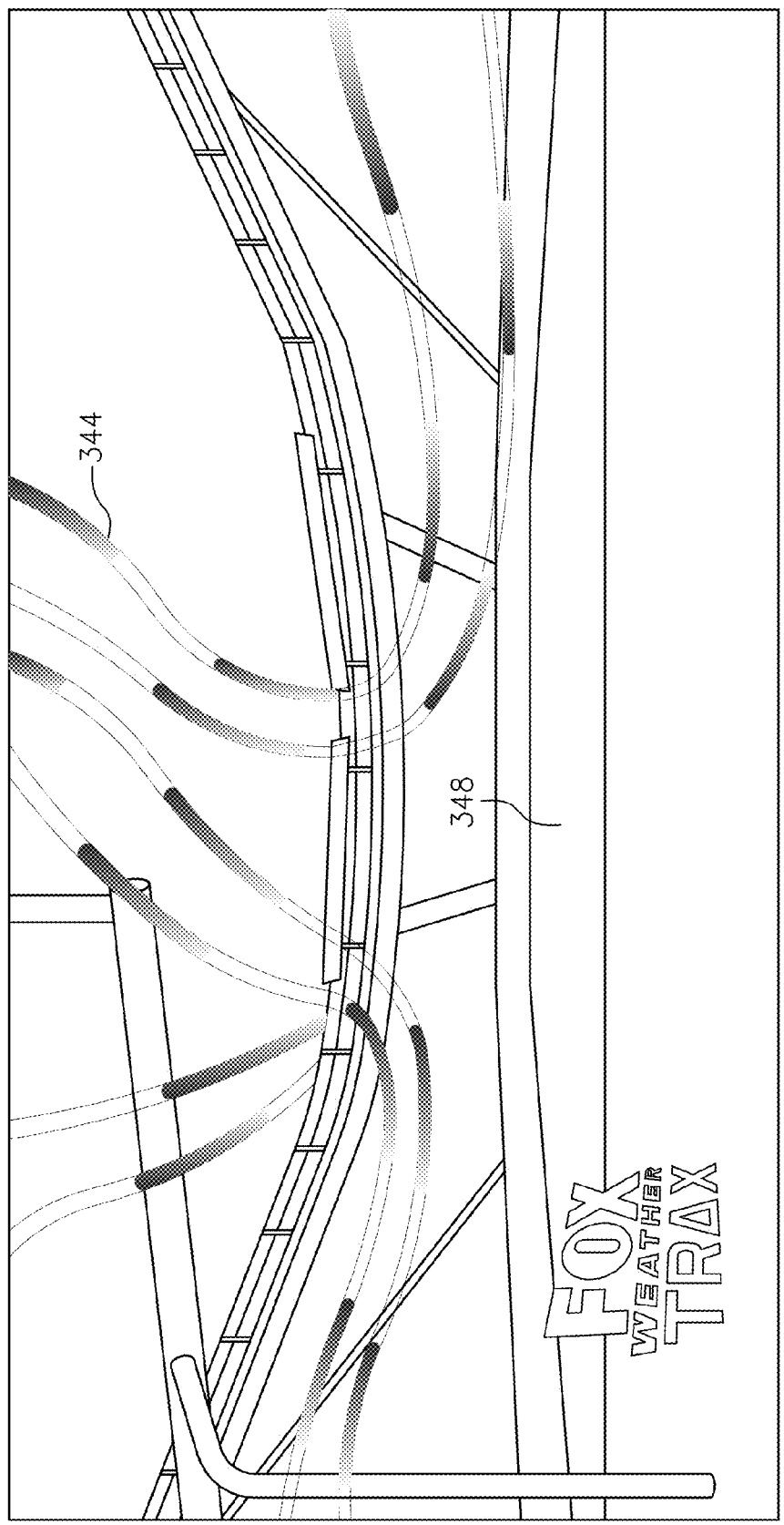
FIG. 31 illustrates an exemplary football screenshot with wind overlays.

FIG. 29 additionally shows an exemplary environmental overlay illustrating wind effects 344 over a race car track 346. Wind (and other environmental aspects, such as temperature, etc.) may be measured and overlaid or simulated relative to the broadcast. With respect to wind, it may be measured at one end of a venue or venue portion and then exported to VSRT in a 3D world, overlaying the field of play. Additionally, multiple sampling points may be integrated into the analysis, or an image may be analyzed relative to ground or atmospheric effects of wind (or other environmental conditions), e.g., dust, heat waves and its motion relative to waves, etc. FIG. 30 illustrates wind effects 344 not just over the track 346, but also over surrounding structures and tracks. FIG. 31 illustrates wind effects 344 relative to a football field 348.

Additionally, such information can reveal effects on the broadcast itself, or as an overlay on objects within the broadcast, e.g., effects on a race car, effects on a ball in play, etc. With regard to thermography (utilizing cameras or other sensors detecting heat), hot spots or cold spots may be detected and displayed, e.g., indicative of exertion or injury of a player, heat of a vehicle or surface, etc. Such thermography is useful in various broadcasts, e.g., sailing, baseball or cricket (heat indicative of a bat hitting the ball), soccer, football, racing, boxing or UFC. As noted above, thermographic, IR, etc. cameras may be used alongside broadcast cameras to detect heat.

Exemplary embodiments also provide for improved edit software, including, without limitation: "fly" between cameras, virtual camera angles, stop motion action, enhanced telestration and visual analysis, etc. The present disclosure may also be used for pre-produced packages, live-in-studio, and large scale events.

Figure 32:
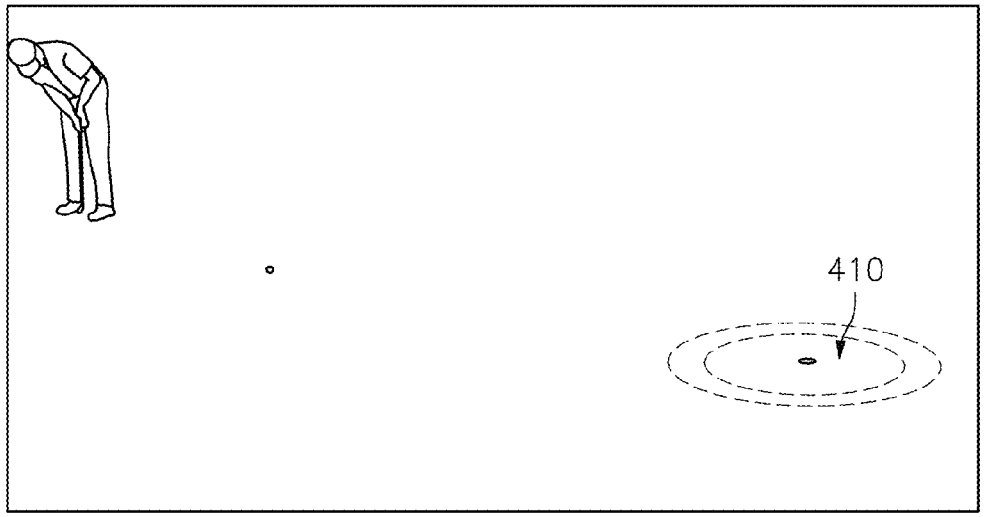
FIG. 32 illustrates an exemplary golf hole highlighting effect.

FIG. 32 illustrates another exemplary overly as a golf hole highlighting effect 410. This exemplary embodiment provides augmented reality for highlighting of a golf hole, with graphics on a green. Advantageously, such embodiments provide direction for a viewer for golf holes that are sometimes difficult to see on a green once the pin has been removed. In other exemplary embodiments, such highlighting is performed automatically via control software that measures relative shading on a green to determine whether such highlighting is advantageous (e.g., by exceeding some difference threshold in shading or other property).

Figure 33:
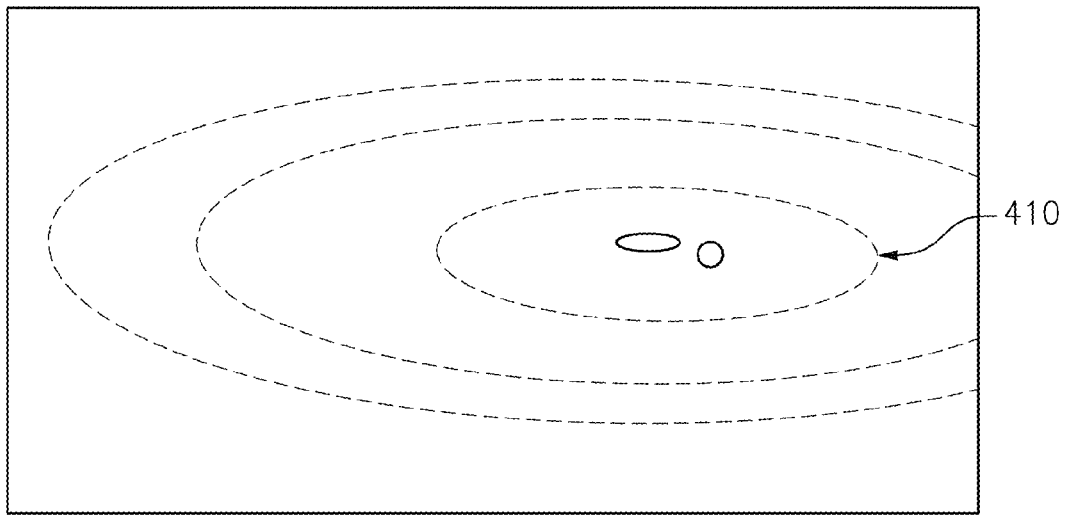
FIG. 33 illustrates the exemplary highlighting effect of FIG. 32 just prior to sinking of a putt.
Figure 34:
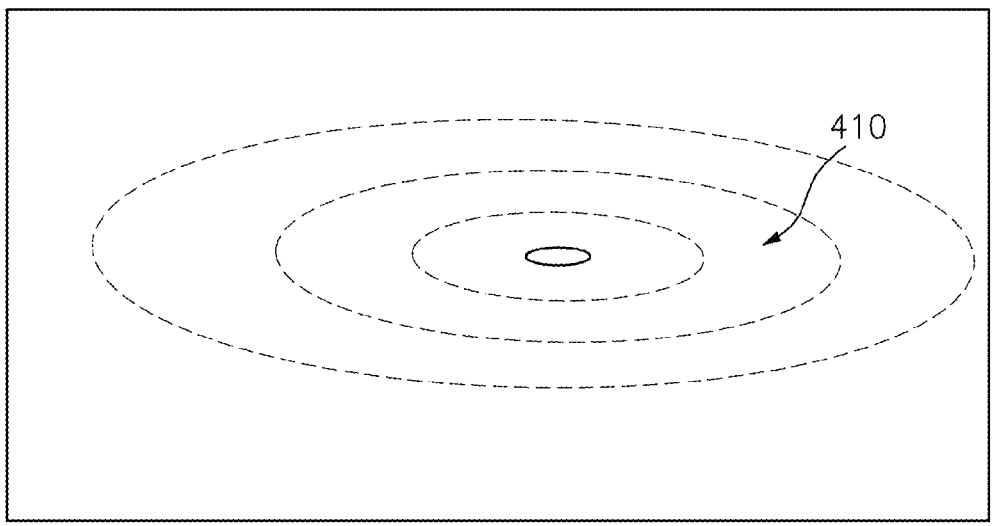
FIG. 34 illustrates the exemplary highlighting effect of FIG. 33 after sinking of a putt with collapse of the highlight.

FIG. 33 illustrates the exemplary highlighting effect of FIG. 32 just prior to sinking of a putt, with a close-up of the hole and highlight. FIG. 34 illustrates the exemplary highlighting effect of FIG. 33 after sinking of a putt with an exemplary collapse of the highlight, emphasizing sinking of the putt.

In other exemplary embodiments, a lidar scan of a golf course is utilized to provide data (in exemplary embodiments, exact data) for topography, distance, scale, etc. Such data may be incorporated with camera calibration and/or pixel tracking data, with mapping of graphics to the course, including hole highlights, yard markers, player identifiers, etc. Other exemplary embodiments provide for insertion of three dimensional objects, such as virtual leaderboards, advertisements, etc.

With regard to the above example describing highlighting of a golf hole, using lidar or otherwise, or any examples presented herein, such methods and systems are also applicable to other broadcasts where highlighting of an object might be desirable, including without limitation, tennis, baseball, football, skiing, etc.

Figure 35:
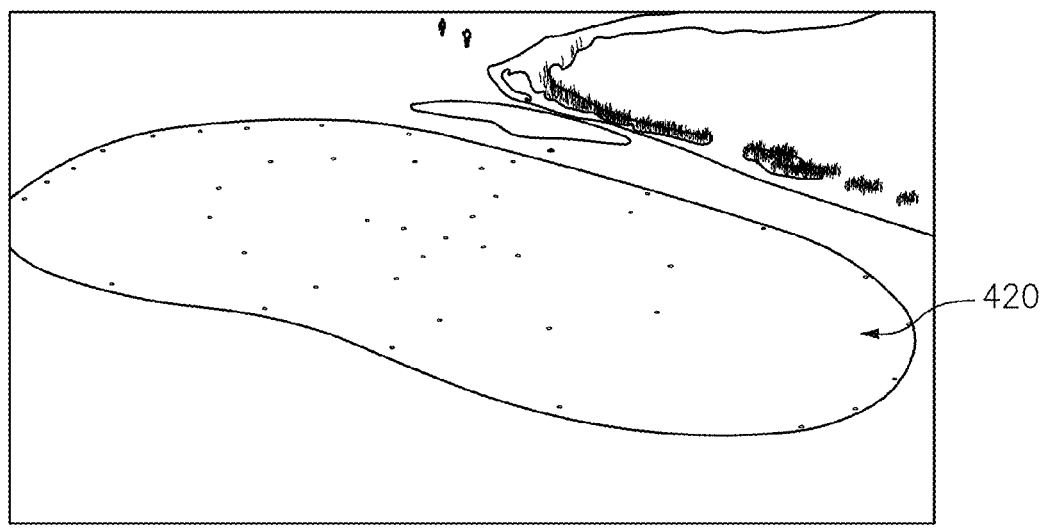
FIG. 35 illustrates an exemplary mapped green.
Figure 36:
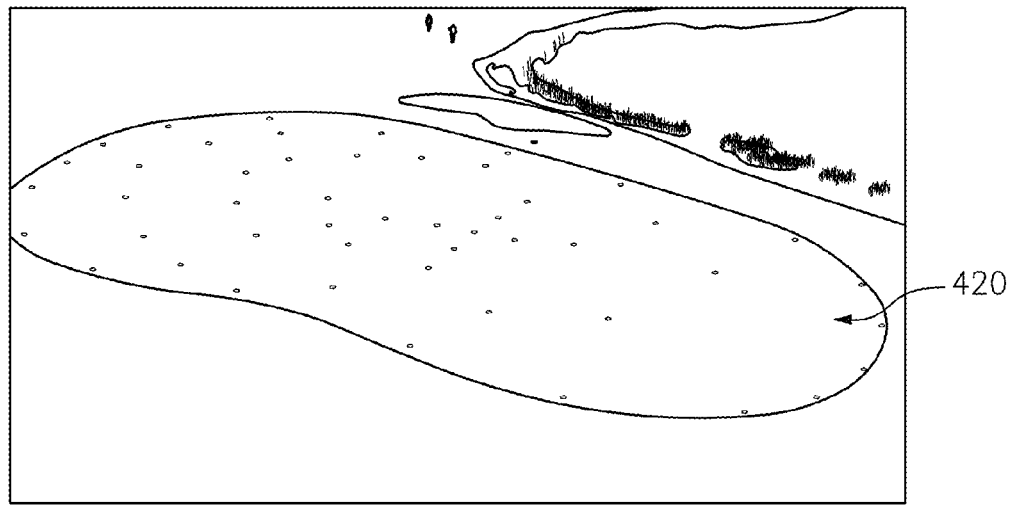
FIG. 36 illustrates the green of FIG. 35 without substantial shading.
Figure 37:
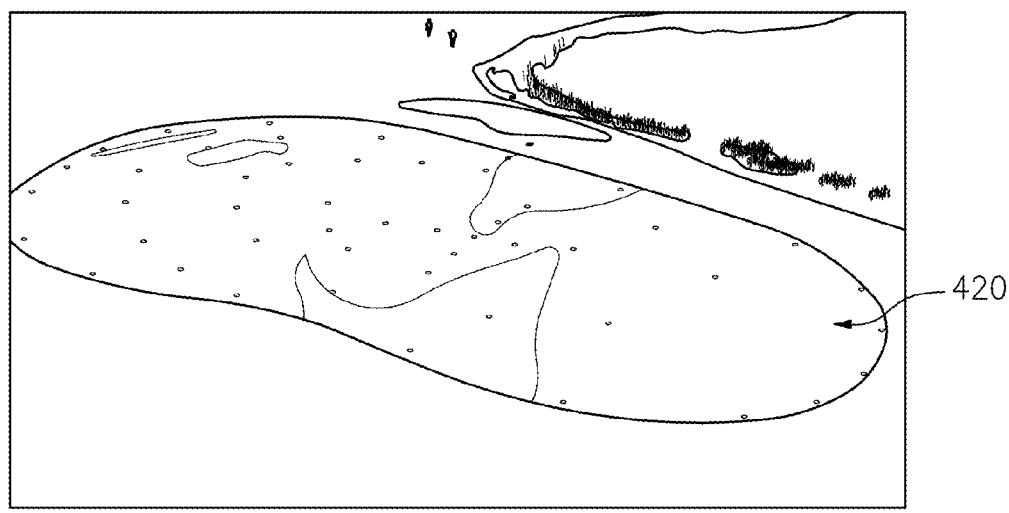
FIG. 37 illustrates the green of FIG. 36 with partial shading.
Figure 38:
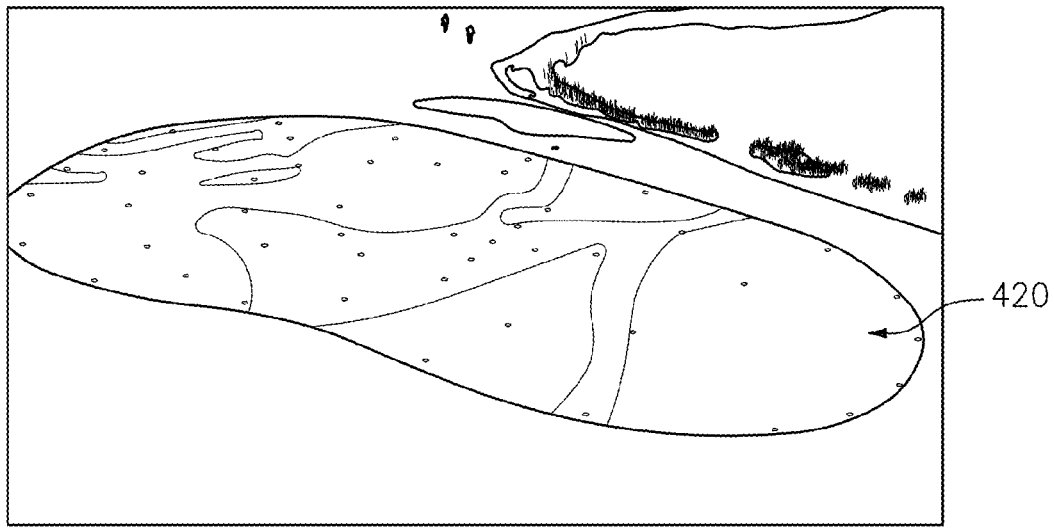
FIG. 38 illustrates the green of FIG. 37 with additional shading.
Figure 39:
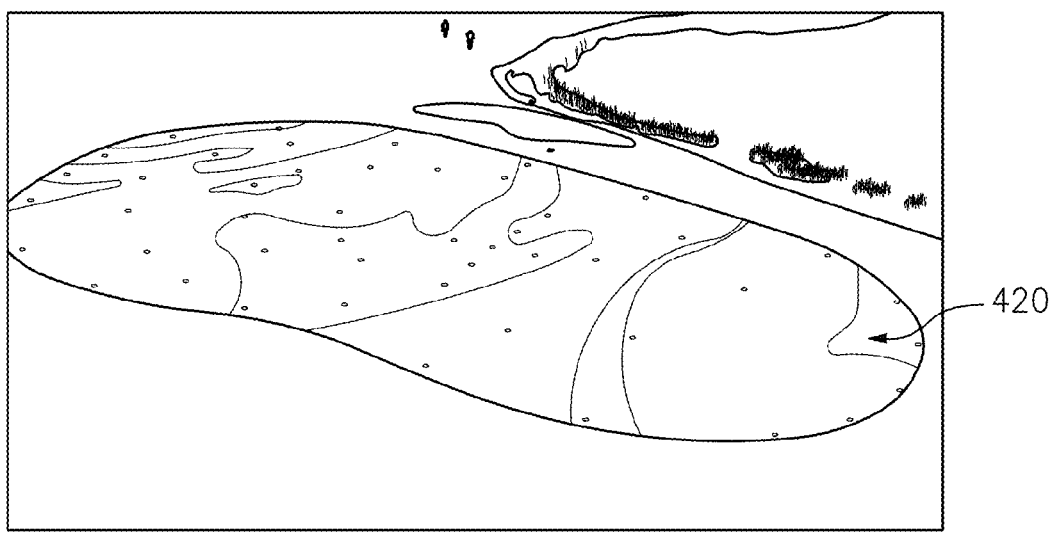
FIG. 39 illustrates the green of FIG. 38 with additional shading.

Referring now to FIG. 35, another exemplary embodiment provides an exemplary mapped green 420, which as further FIGURES will illustrate, provides a graphical enhancement of a green by displaying shadows to emphasize the topography of a green. This exemplary embodiment seeks to dramatically show the undulations of a green by displaying a graphic that appears as shadows cast at an angle (mapping of the green via the white dots is not necessary). FIG. 36 illustrates the green of FIG. 35 without substantial shading. FIG. 37 illustrates the green of FIG. 36 with partial shading. FIG. 38 illustrates the green of FIG. 37 with additional shading. FIG. 39 illustrates the green of FIG. 38 with additional shading.

As above, such mechanisms may employ manually or automatically. If automatically, a system may determine that a level of shading would be desirable, e.g., by comparing levels of shading or color on a green surface.

Also, as above, a lidar scan of a golf course may be utilized to provide such data for a green. Matching a three dimensional model of the course from the lidar scan and marrying it to the live video, the system can control the relative intensity of the gradation effect, as well as direction of the virtual light source on the green.

With regard to the above example describing acquiring topography of a golf course, using lidar or otherwise, or any examples presented herein, such methods and systems are also applicable to other broadcasts where highlighting of an object might be desirable, including without limitation, tennis, baseball, football, skiing, etc.

Further, it should not be ignored that various implementations, including those described below, may use touchscreens as interfacing for controlling any of the various described functions.

Figure 12:
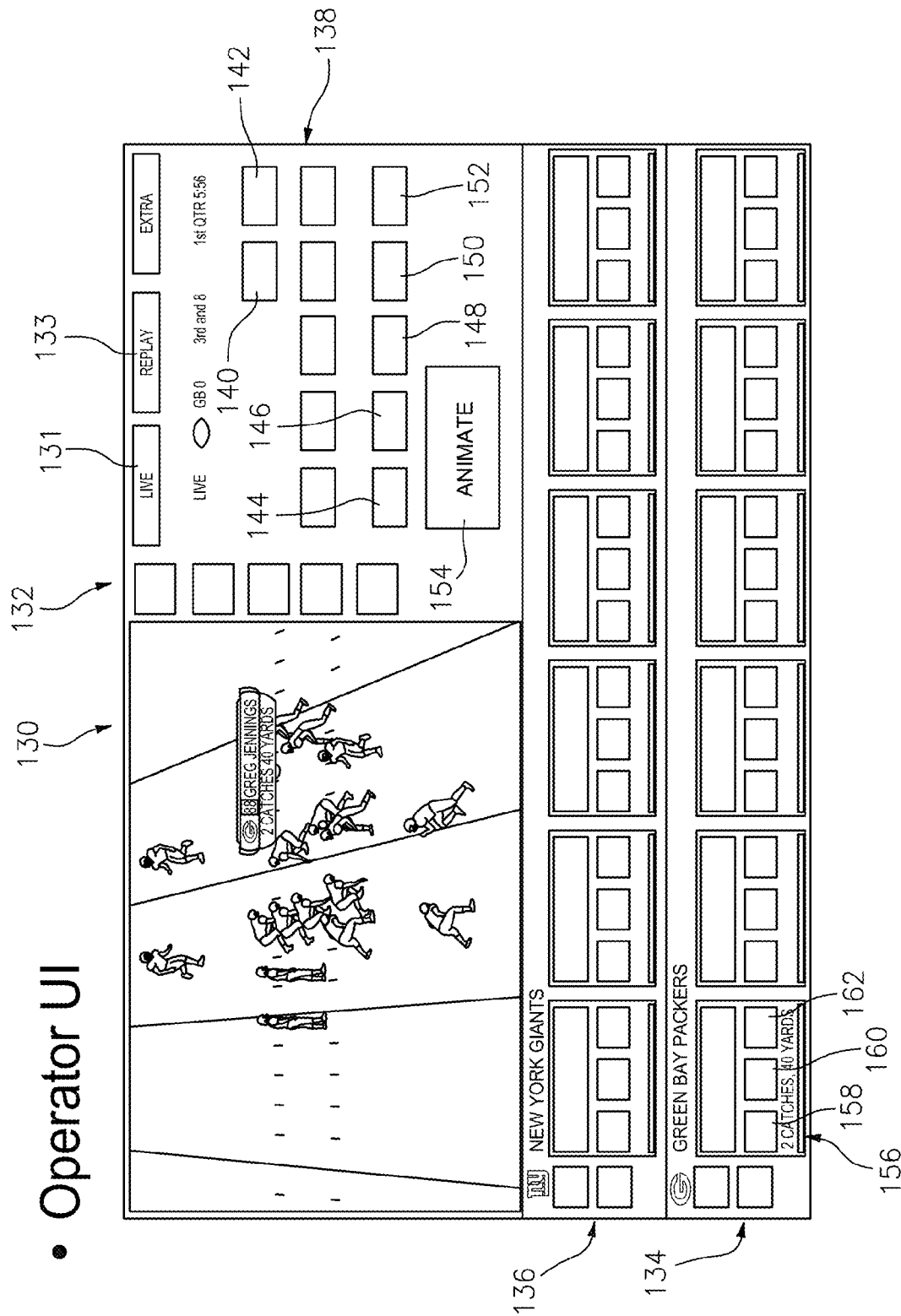
FIG. 12 is an illustration of an exemplary operator's user interface.

FIG. 12 illustrates an exemplary user interface (UI), shown generally at 130, which enables selective view 131, capture, replay 133, etc. of various cameras, shown generally as selections 132, on an event. As can be seen from the figure, this exemplary embodiment is tracking ten players (offense 134 vs. defense 136), and allows for one or more selections via an operator. In exemplary embodiments, one or more monitors may be provided to the operator in order to further facilitate tracking of plural athletes. Also, as can be seen from the figure, the UI contemplates favorites 138, auto 140 and manual 142 modes, highlight 144, swap 146, audio 148, disk 150 and extra 152 modes, as well as animate commands 154. With reference to the tracked players, but without limitation, this particular embodiment facilitates player (one or more) selection of statistics, shown generally at 156, game 158, season 160 or text 162 related.

Figure 13:
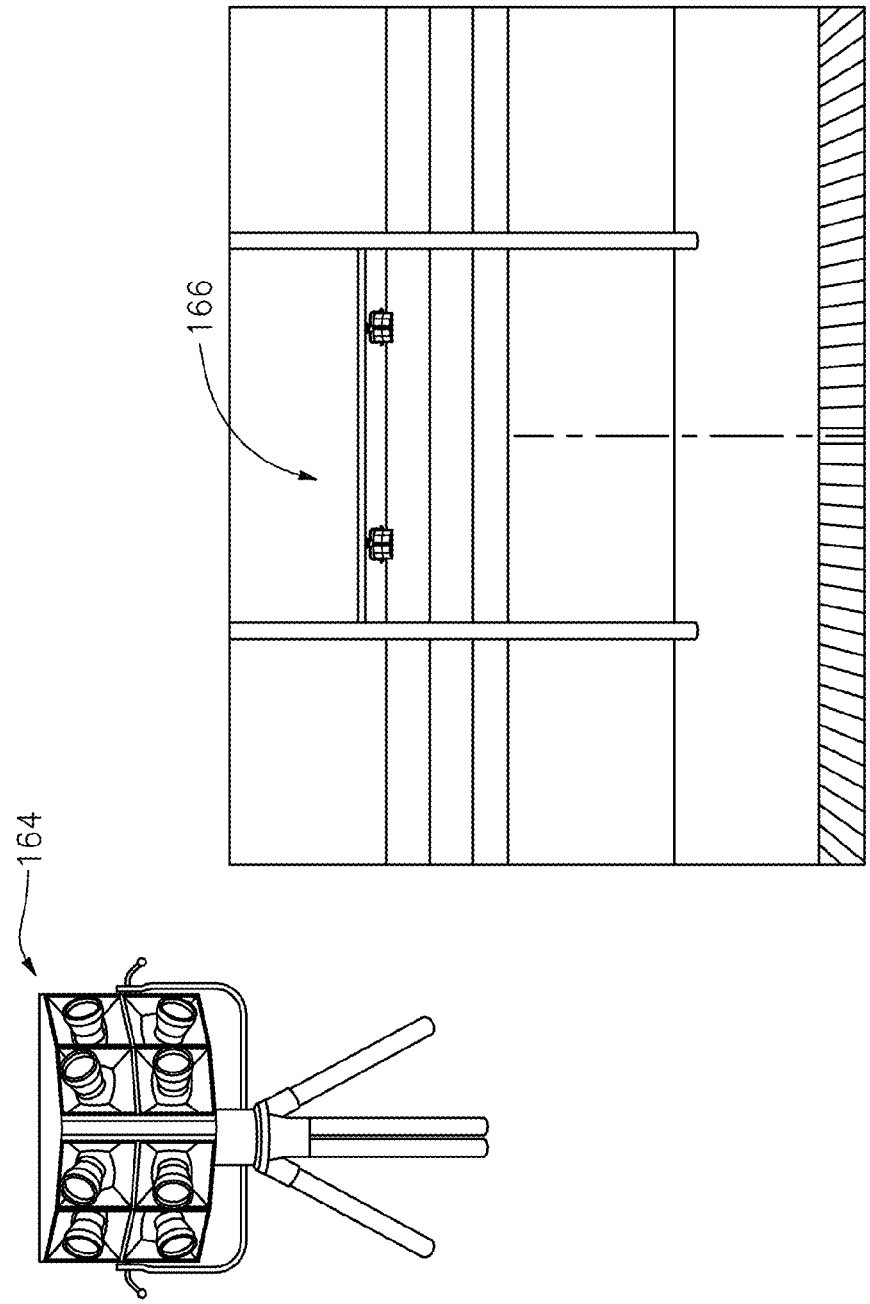
FIG. 13 is an illustration of an exemplary camera and setup.
Figure 14:
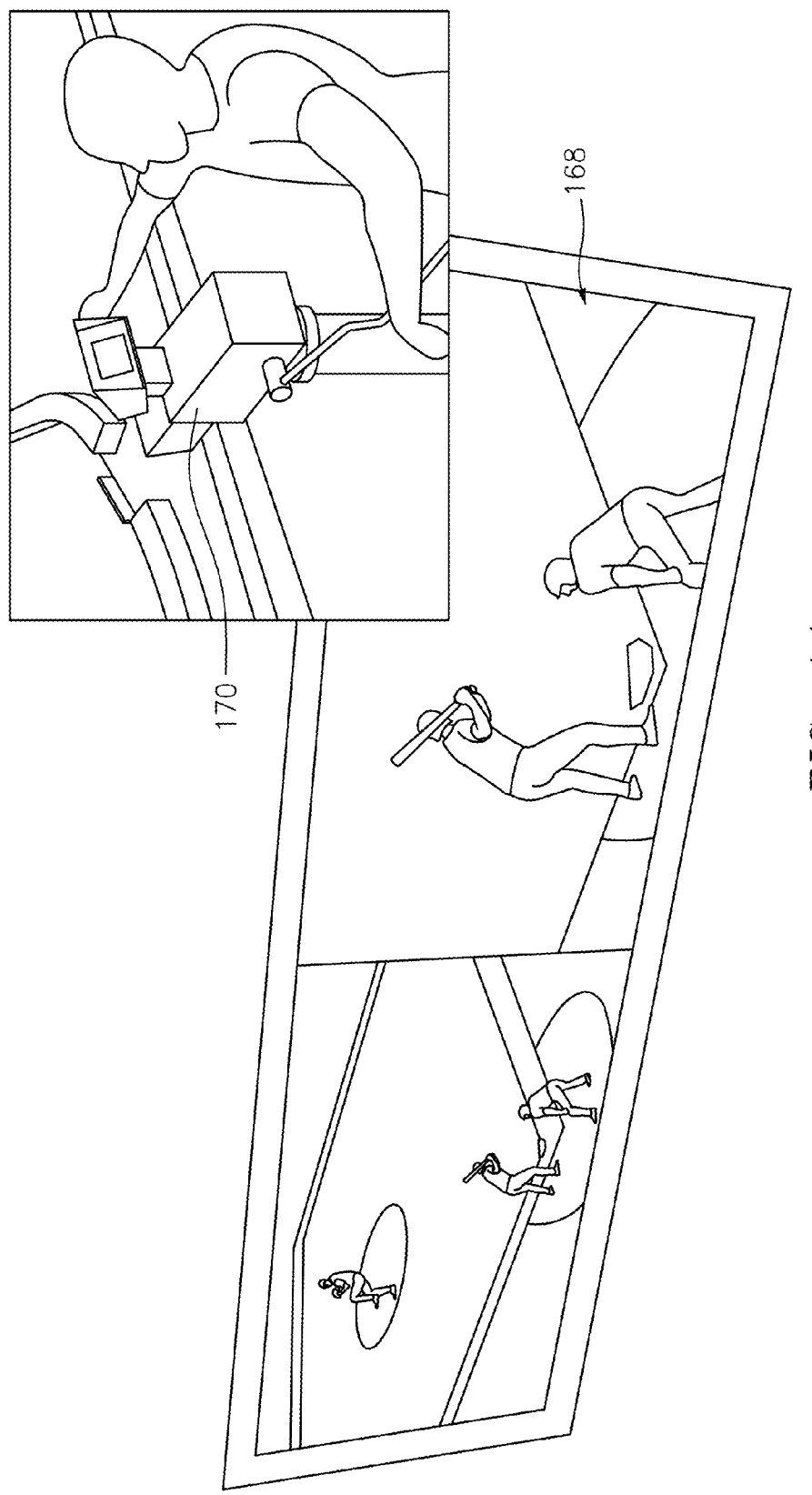
FIG. 14 is an illustration of an exemplary camera and image capture.

FIG. 13 illustrates an exemplary camera setup, showing a camera array generally at 164, as well as a camera hang setup (e.g., 21 feet on the field center line), shown generally at 166, for football. FIG. 14 shows captured image 168 from cameras 170.

Figure 15:
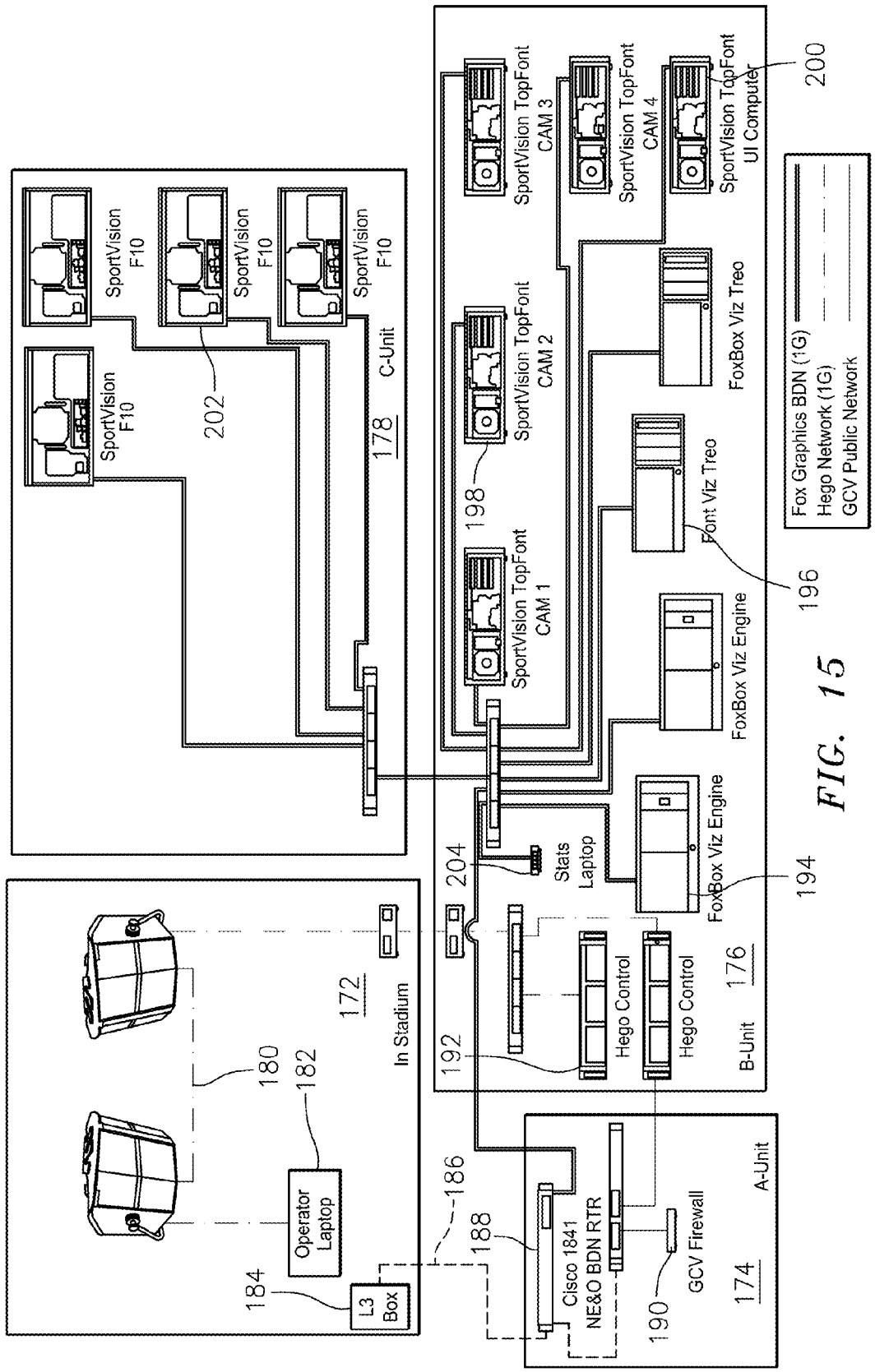
FIG. 15 is an exemplary system plan in accordance with embodiments of the present disclosure.
Figure 16:
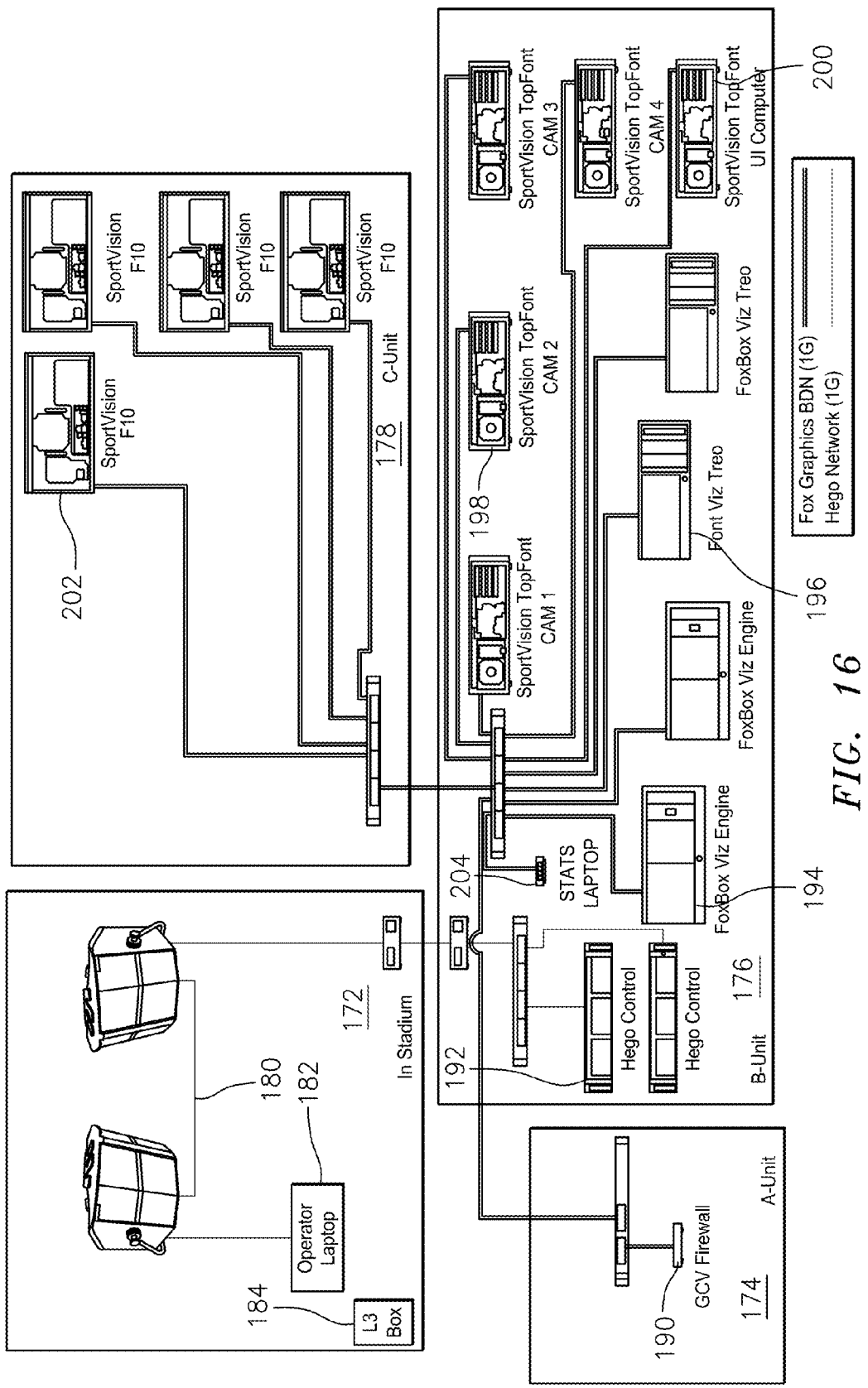
FIG. 16 is another exemplary system plan in accordance with embodiments of the present disclosure.

FIGS. 15-18 illustrate an exemplary control setup for such a system, including in-stadium components 172, A-Unit components 174, B-Unit components 176 and C-Unit components 178. FIGS. 15 and 16 illustrate camera arrays 180 and an operator laptop 182 and connection 186 via an L3 Box 184 to a router 188 and firewall 190 in the A-Unit. B-Unit includes control engines 192, Viz engines 194, Viz Treos 196 and top font cam processing systems 198 alongside a UI computer 200. C-Unit shows SportVision systems 202. A stats laptop 204 is also illustrated in the B-Unit.

Figure 17:
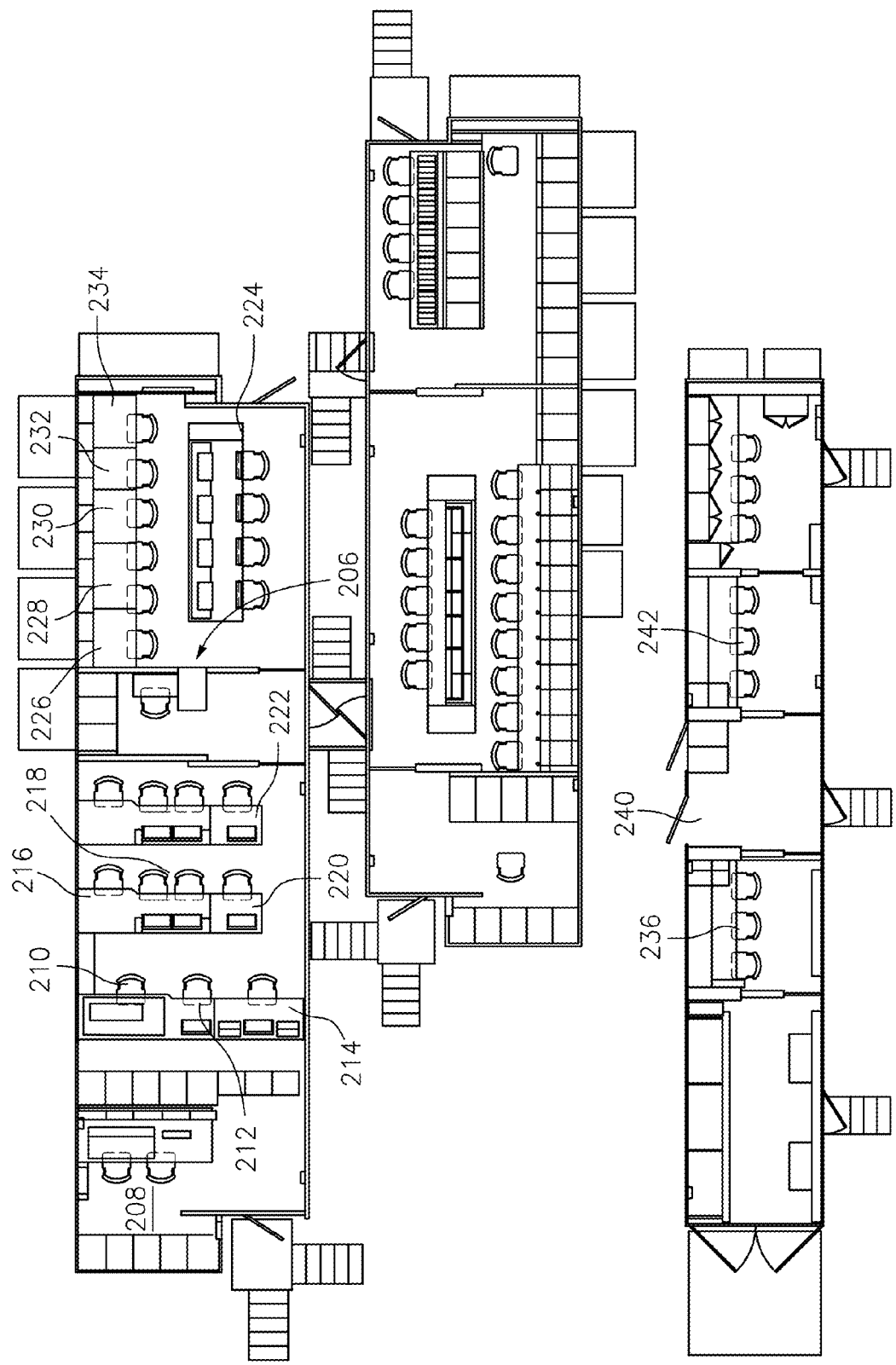
FIG. 17 is an exemplary workstation layout in accordance with embodiments of the present disclosure.
Figure 18:
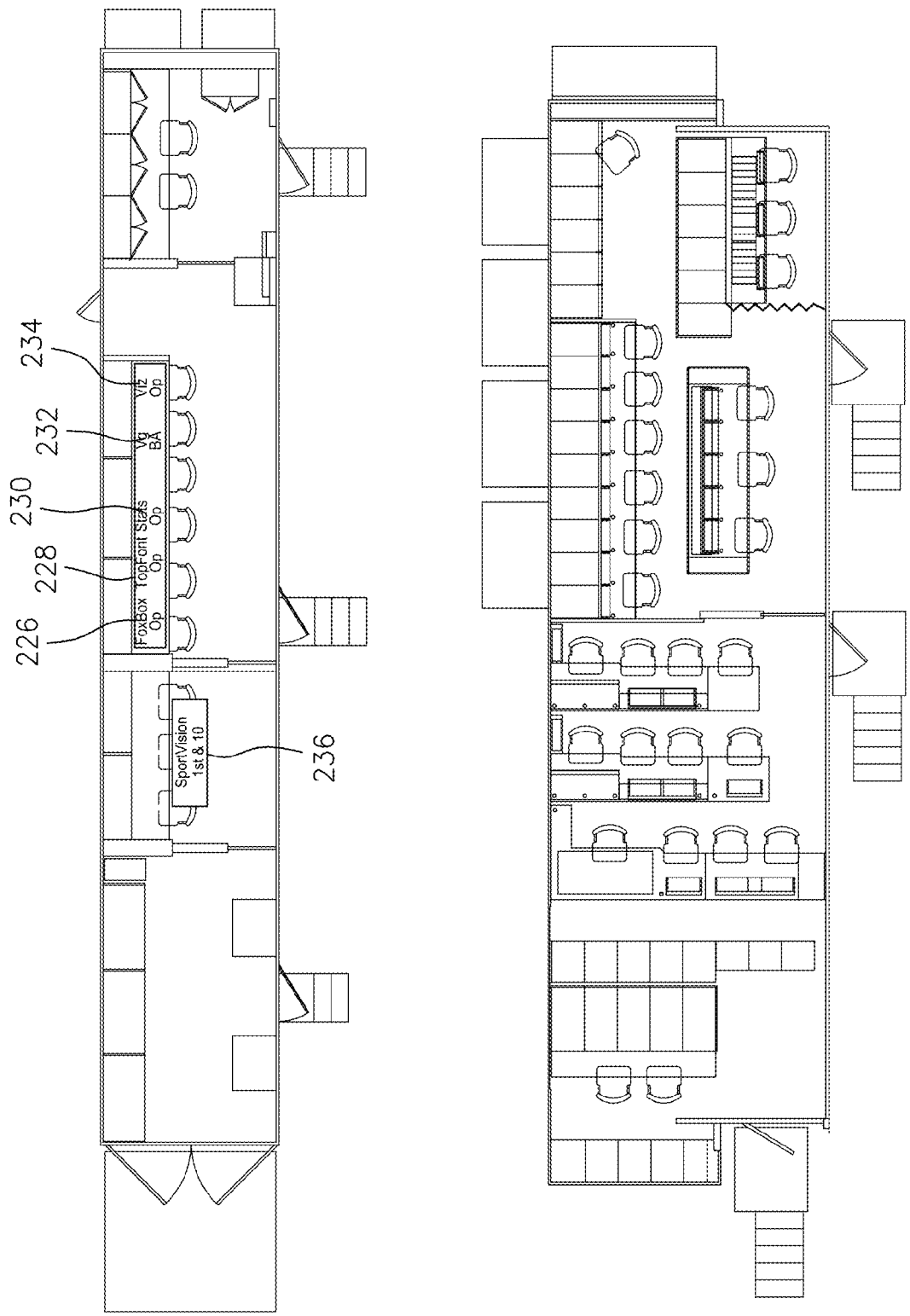
FIG. 18 is another exemplary workstation layout in accordance with embodiments of the present disclosure.

FIG. 17 shows the graphics racks 206 surrounded by various studio stations, including audio submix 208, TD 210, Director 212, Producer 214, 8 Second Guy 216, AD 218, Exec 220, Tech manager 222, stats 224, FoxBox Op 226, Topfont operator 228, Stats Op 230, Viz BA 232, Viz Op 234, along with SportVision 1&10 236 in an edit room 238, a 4K operator 240 and a Game Edit 242.

In an exemplary embodiment, Network Connectivity vs. Systems Closed Network include Cat5 to camera, Fiber to Camera or Fiber to truck, with an unobstructed view of field, a monitor showing previews of all renders, a program monitor, and a PL station with Iso to TopFont Operator (e.g., with a 2 Channel beltpack or a KP Panel). Two or more single mode fibers may be used for the monitoring feed, potentially a $3^{rd}$ to put on a RVON KP panel.

In exemplary embodiments, optical tracking tracks moving objects on a field of play. This includes any type of tracking, be it image recognition, motion sensitive indication of possible tracking, etc.

An exemplary system is proposed below as Example 1:

Example 1

Scope

This procedure applies to \ "A" Crew, but could be applied in general to any originated broadcast for which TracAB is desired.

This will apply to the operations on site. It is assumed that all the under the hood workings between affiliates are working.

Example 1

Roles

TracAB Operator—Primarily responsible for performing field alignment of TracAB cameras and tagging players during the event. Communicates with TopFont Operator with regards to the status of the objects currently being tracked. Located in the stadium in a location that allows for an unobstructed view of the field. Works with department with regards to obtaining available fiber in the building. Works with Sports Audio department with regards to setting up Intercom at operating position. Troubleshoot TracAB system as needed. Relays to Tech Manager any issues with setup or operation of equipment in a timely fashion.

TopFont Operator—Primarily responsible for inserting TopFonts during broadcast using company provided touchscreen interface. Communicates with Producer, Director, Stats, Graphics BA in identifying what graphics are needed when. Also works with Tape Room for enhancements on replays. Communicates with TracAB Operator regarding key players that need to be tagged for each series. Troubleshoot TopFont system as needed. Relays any issues with setup or operation of equipment to Tech Manager in a timely fashion.

First and 10 Operator—Builds provided tripods and panheads for 4 camera locations. Calibrates those panheads and cameras for use for both the First and 10 system and the TopFont System. Verifies connectivity to the TopFont System. Operates First and 10 system during game. Troubleshoots First and 10 system, Pan, Tilt, Zoom data as needed. Relays any issues with setup or operation of equipment to Tech Manager, Techincal Director and EIC in a timely fashion.

EVS Operators—Verify that all machines are setup to record and playback RP-188 Timecode properly. Performs test with Technical Director and TopFont Operator on set day to verify. Relays any issues with operation of Equipment to Tech Manager and EIC in a timely fashion.

Mobile Unit Engineers—Works to integrate systems into the broadcast both from a video standpoint and a networking standpoint. Verify all signals are present and acceptable. Assist TracAB Operator, TopFont Operator, First and 10 Operator with troubleshooting as able.

Example 1

Definitions and Acronyms

TracAB—Optical tracking system consisting of 2 camera arrays, a processing computer and a tracking computer. In this instance, it will be used to provide positioning information of objects (players) in a 3D space for the use of inserting informational graphics. These devices will be networked together using gigabit Ethernet switches on their own closed network. The processing computer will be connected via a second NIC to the graphics network.

TopFont—TopFonts to be delivered as a composited HD-SDI version of one of 4 cameras through 4 separate renderers. The system consists of a User Interface computer with a touch screen and 4 rendering computers. Each of these 5 computers will be networked together using gigabit Ethernet switches to the graphics network.

First and 10—The system which currently inserts the down and distance ("yellow line").

Media Converter—An optical-electrical converter. In this case, it is used for the purpose of converting Ethernet to fiber in the stadium, and then fiber back to Ethernet at the truck location.

BDN—Fox's Broadcast Data Network used as the graphics network on the NFL Games.

Fiber Optic Cable—In this document any Fiber optic cable will be referring to single mode fiber unless otherwise specified.

GBE Switch—A managed switch capable of transmissions of 1 gbps between ports.

Example 1

Procedural Steps

Example 1

Initial Integration

Identify space for 4 RU of processing computers. Install Processing computers in racks. Install GBE switch for closed network. Connect NIC 1 from each processing computer to the GBE Switch for closed network. Set IP Address information on NIC 2 of systems provided processing computers using IP information for the graphics network.

HD-SDI input and output need to be connected to each renderer and made available in production switcher and routing switcher. Preview output of each TopFont Render will be provided by a scan-converted output. This needs to be made available in the routing switcher.

First and 10 System is installed as normal. The First and 10 system is not included in the 20 RU count.

Set IP address information on each of the provided computers (rendering engines, user interface computers) using IP information for the graphics network. (Hopefully the IP Address information can be provided before the machines ship, but this may not be the case).

Connect each of the provided computers to the gigabit Ethernet switch that contains the graphics network. Connect Top Font Operator User Interface position. Turn on all computers and verify network connectivity between all devices in the truck.

Example 1

Weekly TracAB Setup

TracAB mounting locations are verified with stadium personnel and Tech Manager. TracAB cameras unloaded out of C-Unit and transported into Stadium. TracAB camera arrays are mounted.

Take Reference picture from alongside each TracAB camera array. Power is needed at each TracAB array. Ethernet Cable is used to connect from one TracAB array to the other.

If the distance is too great for GBE signals to pass, or it is not physically possible to run a CAT-5 Cable between the cameras, a set of GBE Capable media converters may be used between the cameras. One TracAB array is connected to the closed Hego Systems network in the truck via a Gigabit capable media converter. The other TracAB array is connected to the TracAB operators laptop by Ethernet cable. If the distance is too great for GBE signals to pass, or it is not physically possible to run a CAT-5 Cable between the camera and the operating position, a set of GBE Capable media converters may be used between the camera and the operating position or the truck and the operating position.

TracAB Operator sets up operating position consisting of video monitor, laptop computer and intercom. TracAB Operator calibrates arrays and verifies everything with regards to the TracAB system is functioning properly. TracAB Operator reports to Tech Manager when system is fully operational.

An exemplary user Interface (UI) that may be used to tag the players is described immediately below:

Exemplary cameras track the players and send the information to a computer. An operator on the computer either: manually tags the players; views an automatic tag; or confirms an automatic tag. This data is passed onto a computer where an operator can now render the appropriate graphic to air.

Optical tracking tracks moving objects on a field of play, which can be a relatively manual process of assigning the proper player to the right moving object. However, additional exemplary embodiments may work as follows:

Exemplary processes and workflow allow tagging of players quickly. This can include moving the physical tagging process to the truck, instead of at stands or by the cameras. The present disclosure also suggests various strategies to tag players using game cameras, e.g., routing appropriate game cameras to the operator for more efficient tagging.

The present disclosure also describes a wholly different way to track players, such as a method of having the graphics operator be able to tag players from his user interface, by potentially using his touchscreen.

The present disclosure also contemplates a reverse tagging method, to relate a player on the screen on the field and ask the tagging computer which player is closest to the place on the field which was touched on the other computer. It may then tag the appropriate player with the object that is closest on the field.

Further, this technology may be used for advantage with greater than HD technology, particularly in area of interest highlight. For example, the greater than HD technology described herein may be utilized in combination with player tracking, etc. Exemplary embodiments also contemplate, in addition to that described below, a preset and controlled extraction window that pans, scans and/or zooms utilizing tracking data (i.e., controlling an extraction window utilizing tracking data).

An exemplary process is so:

Start with full raster greater than HD video, e.g., 4 k video.

A graphical box or cursor, representing the area to which we are interested may appear.

The view then zooms to fill the box.

Exemplary embodiments of greater than HD systems and methods follow: a first image or video is captured at a first resolution, which resolution is greater than high definition and higher than a predetermined broadcast display resolution. A desired portion of the first image or video is then displayed at a second, lower resolution, which resolution is less than and closer to the predetermined broadcast display resolution. Accordingly, a selected portion of the captured image may be displayed at or near the predetermined broadcast display resolution (i.e., minimizing or eliminating loss of image detail relative to the predetermined broadcast display resolution).

Figure 19:
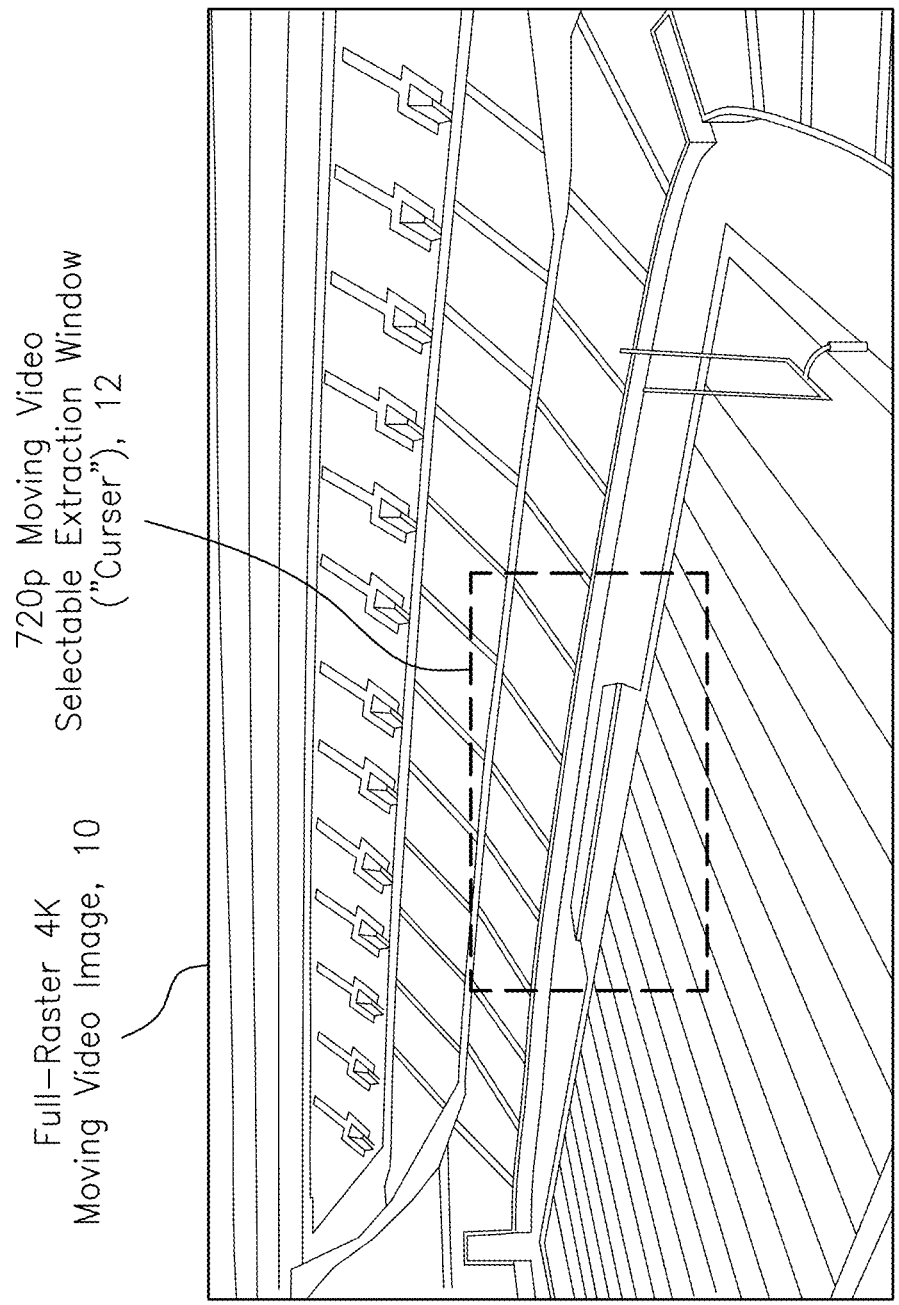
FIG. 19 is an exemplary graphical user interface of a 4K captured image with a 720p selectable extraction window.
Figure 20:
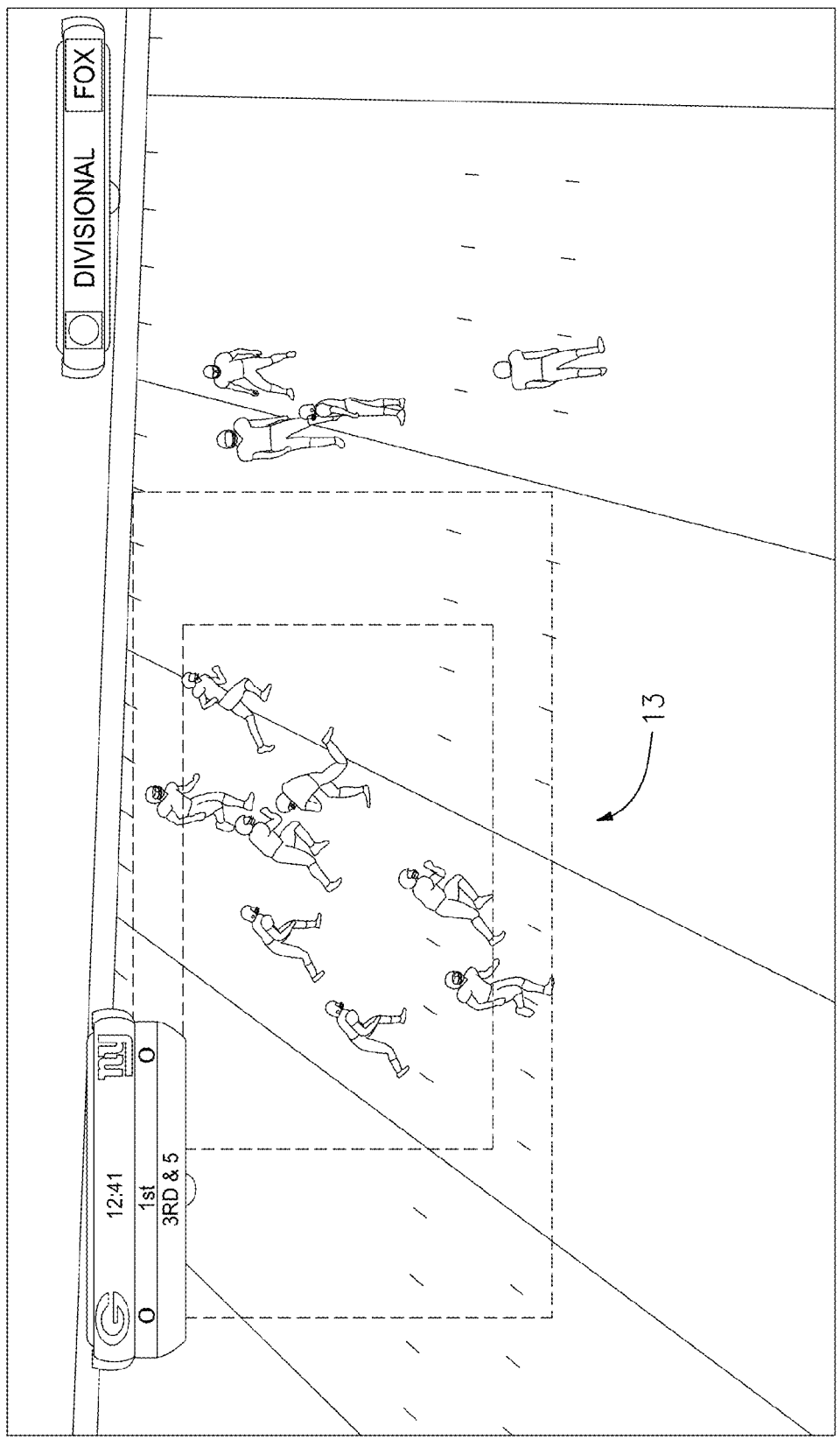
FIG. 20 illustrates an exemplary embodiment showing relative extractions.

An example of this is illustrated at FIG. 19, which shows a screenshot of a full-raster 4K moving video image 10. A portion of the 4K image, illustrated as a 720p moving video selectable extraction window 12, is then selected for presentation. Thus, native image capture occurs at a greater than high definition resolution, and portions of that greater than high definition image are selected for presentation via the 720p extraction window. While, FIG. 17 specifically illustrates 4K capture and a 720p extraction window, it should be recognized that both or either of the captured image and extraction window may be provided at or sized to other resolutions. FIG. 20 shows a similar view of relative extractions, provided generally at 13.

Also, while one extraction window is illustrated in FIG. 19, the present disclosure contemplates simultaneous multiple extraction windows that may be applied to the same captured image.

In further exemplary embodiments, the selectable extraction window (12 in FIG. 19) is provided at a graphical user interface ("GUI") (14 in FIGS. 21 and 22) that is configured to allow an operator to navigate within a captured image and select portions of the captured image for presentation. In exemplary embodiments, the extraction window is configured to allow the operator to adjust the size and position of the extraction window. In other exemplary embodiments, the extraction window is configured to track or scan across moving images, e.g., to follow a play or subject of interest during a sporting event. In other exemplary embodiments, plural operators may extract from the same images via the same or via plural GUIs.

Figure 21:
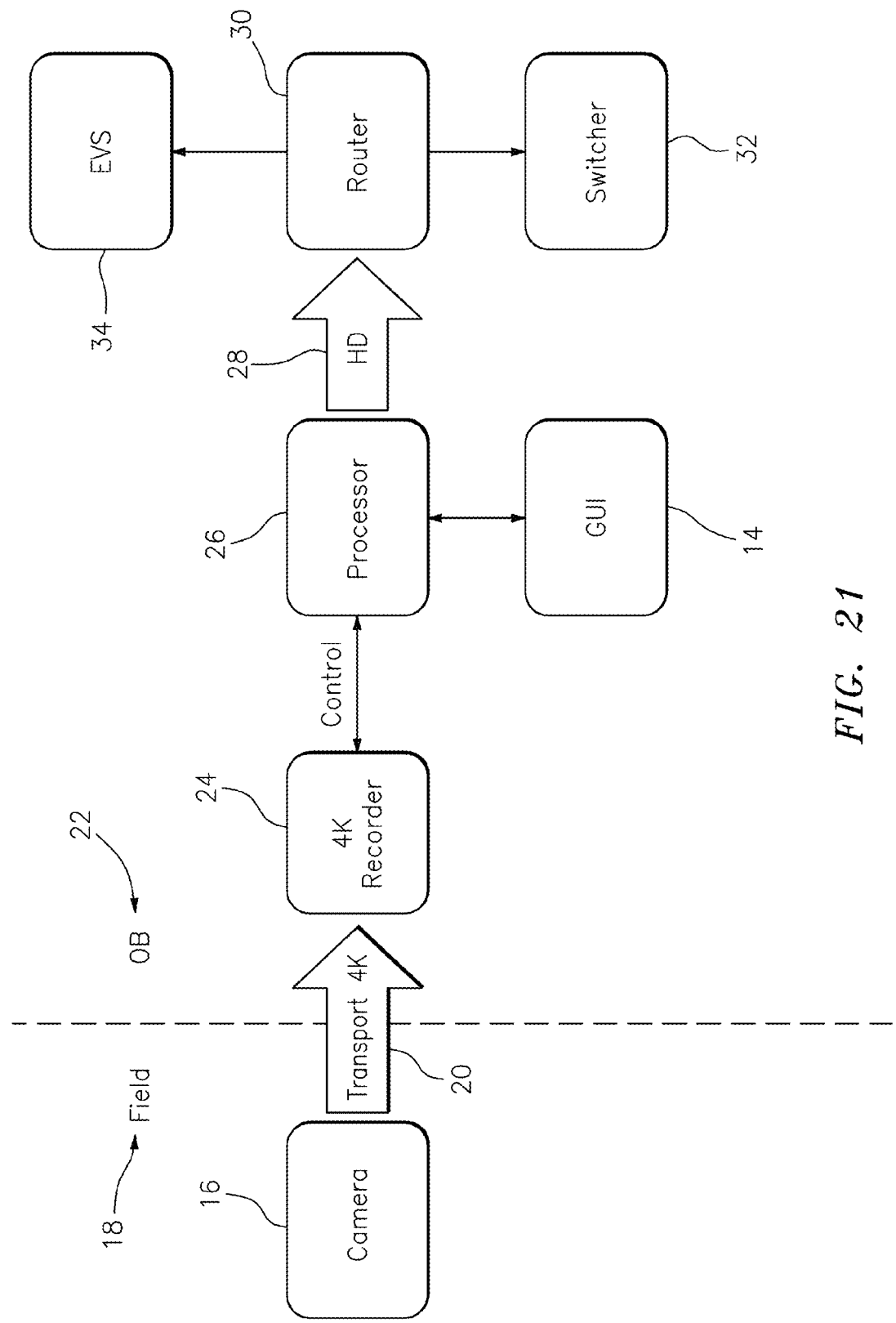
FIG. 21 is an exemplary first system for capturing and transporting a 4K image to an offsite processor and graphical user interface.
Figure 22:
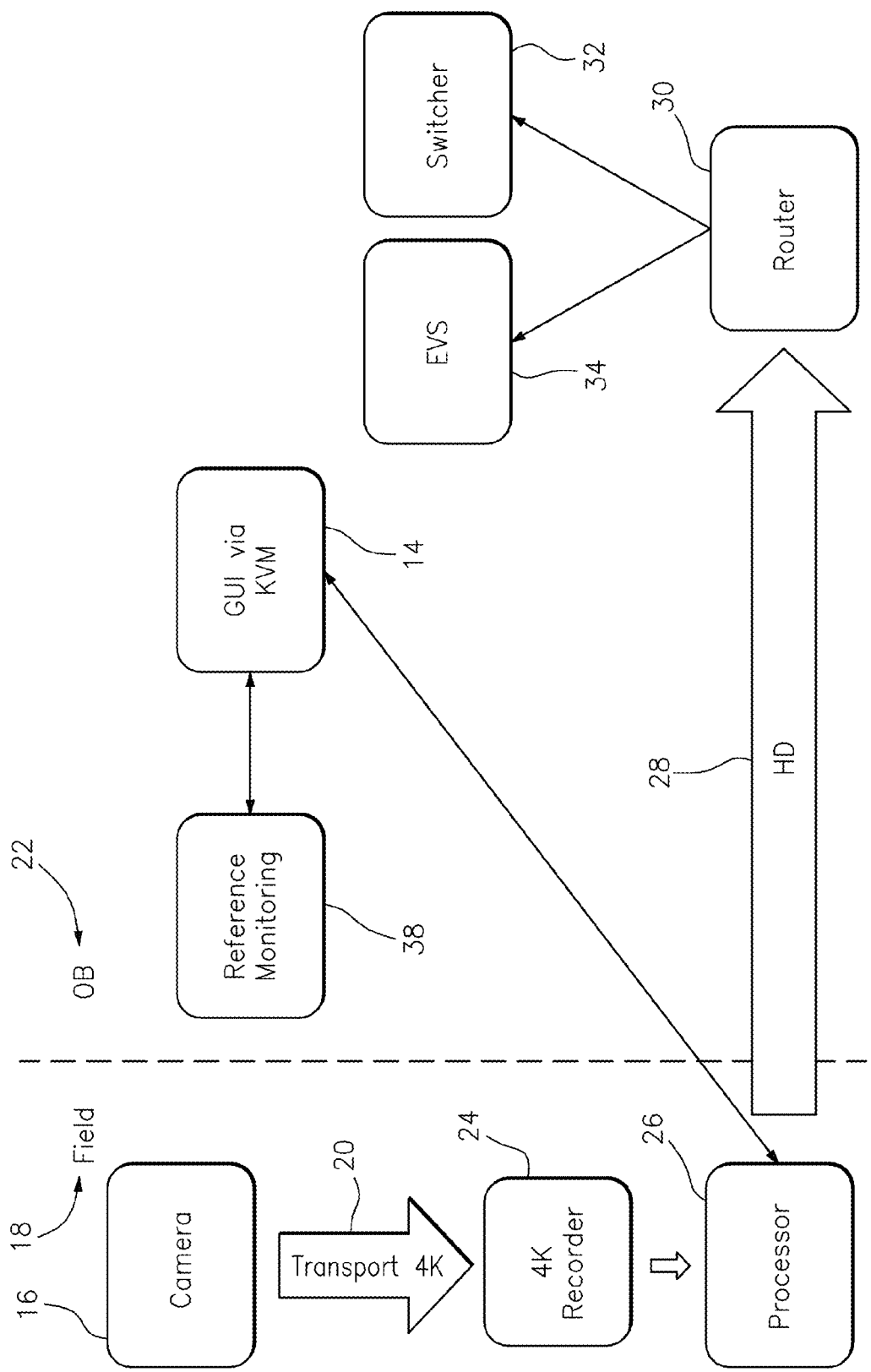
FIG. 22 is an exemplary second system for capturing and processing a 4K image onsite, followed by transport of a high definition image offsite.

Referring now to FIGS. 21 and 22, processing of the captured images may occur either offsite (FIG. 21) or onsite (FIG. 22). Referring to FIG. 21, an exemplary system is illustrated wherein a camera 16 captures 4K images onsite, e.g., at a field (shown generally at 18) for a sporting event. A transport mechanism 20, e.g. a fiber capable of transporting a full bandwidth 4K video, transports the captured images to an operations base ("OB") (shown generally at 22), e.g., a production truck away from the field 18.

An image recorder 24 records the captured images, e.g., as a data stream on a server, and is configured to allow an operator to go back in time relative to the recording and examine selected portions of the captured image as described above. Such control is provided to an operator via the GUI 14 through a processor 26 interfacing with the GUI 14 and recorder 24. In exemplary embodiments, the recorder, processor and GUI are configured to allow the operator to go back instantaneously or near-instantaneously to select portions of the recorded image for presentation.

For example, with regard to FIG. 21, an operator in a truck would use a GUI to navigate the full raster 4K image and maneuver the selective 16:9 extraction window, in a manner similar to a cursor, to select an area of interest. In exemplary embodiments, the GUI is configured such that the extraction window may select an area of interest in one or both of live and recorded video. Also, as has been noted above, the present disclosure contemplates sizing and zooming capabilities for the extraction window. In other exemplary embodiments, the system is configured to mark keyframes and establish mapping for desired moves, e.g., pans and zooms, among others, around the image.

Referring again to FIG. 22, in exemplary embodiments, the output 28 of the system (e.g., a 720p/59.94 output relative to a 4K capture) is provided to a router 30 that allows the output to be taken live to a switcher 32 or to be ingested at a server 34 ("EVS") for later playout. Also, in exemplary embodiments, a resulting image can be slowed down for replay or rendered as a still image, if desired, either at the server 34 or at the operator's position (via processor 26).

FIG. 22 provides an alternate exemplary embodiment, wherein capture, transport and recording of the native image (in this example 4K images) occurs onsite, e.g., at the field 18 of a sporting event). An onsite processor 26 provides or interfaces with an operator GUI 14 in an operations base 22 (e.g., a truck, though the GUI could be accessed from any convenient location) and provides a reference video 38 of the image to allow the operator to navigate the image via the extraction window. The output 28 is then transported from the field to an offsite router 30.

In another embodiment, at least one GUI is accessed by a tablet controller as a navigation tool for the system. Such tablet controller may be wireless and portable to allow for flexible a primary or supplemental navigation tool.

In other exemplary embodiments, multiple cameras may be positioned to capture images from different points of view, and extraction windows may be provided relative to the multiple image captures in a system for selectively displaying portions of native images from different points of view.

Further exemplary embodiments provide real time or near real time tracking of subjects of interest (e.g., identified, selected or pre-tagged players of interest or automatic tracking of a ball in a game). Additional exemplary embodiments also provide virtual directing of operated and automatically tracked subjects of interest for cutting into a full live broadcast, utilizing backend software and tracking technology to provide a virtual viewfinder that operates in manners similar to otherwise human camera operators. Such processes may also use artificial technology for simple tracking, e.g., of a single identified object, or for more complex operations approximating motions utilized by human camera operators, e.g., pan, tilt and zoom of the extraction window in a manner similar to human operators. For those examples using 4K (or the like) capture, camera capture could utilize a specifically designed 4K camera. A camera may also use wider lensing to capture more of the subject, with possible reconstituting or flattening in post production. Also, different lensing can be used specific to different applications.

Such processes may use the above-described multiple cameras and/or multiple extraction windows, or may run with specific regard to one camera and/or one extraction window. In such a way, an artificial intelligence can automatically capture, extract and display material for broadcast, utilizing the extraction window(s) as virtual viewfinders.

Additional exemplary embodiments also provide for virtual 3D extraction, e.g. via s single camera at 4K or 8K with a two window output.

In other exemplary embodiments, an increased image capture frame rates relative to a broadcast frame rate along with or in lieu of an increased image capture resolution, as has been discussed above.

In such embodiments, a first video is captured at a first frame rate, which frame rate is higher than a predetermined broadcast frame rate. A desired portion of the first video is then displayed at a second, lower frame rate, which frame rate is less than and closer to the predetermined broadcast frame rate. The desired portion of the first video is captured by an extraction window that extracts frames across the native captured video. In such a way, the extracted video provides smooth and clear video, without edgy or blurred frames. Such captured first video may be at any frame rate that is above the predetermined broadcast frame rate.

In further exemplary embodiments, the first video is captured at a first frame rate that is in super motion or hyper motion. In traditional video, this equates to approximately 180 ("supermotion") frames per second or above ("hypermotion" or "ultramotion") in a progressive frame rate. In exemplary embodiments, hypermotion is recorded in discrete times sufficient to capture a triggered instance of an action of camera subject for playback. In other exemplary embodiments, the present system performs a full time record of a camera in hypermotion, e.g., of sufficient length for replay playback archiving, such as more than fifteen minutes, more than thirty minutes, more than an hour, more than an hour and a half, or more than two hours, among others.

In other exemplary embodiments, raw data from at least one camera is manipulated to adjust the image quality (make it "paintable") to broadcast specifications. In exemplary embodiments, broadcast "handles" may be integrated into the system to affect the raw data in a manner that is more germane to broadcast color temperatures, hues and gamma variables.

The present disclosure thus advantageously provides systems and methods for selective capture of and presentation of native image portions, for broadcast production or other applications. By providing exemplary embodiments using a selectable extraction window through a GUI, an operator has complete control over portions within the native images that the operator desires for presentation. Also, by providing exemplary embodiments with image capture greater than high definition (e.g., 4K), desired portions of the image selected by an operator may be presented at or relatively near high definition quality (i.e., without relative degradation of image quality). Further, by providing exemplary embodiments with image capture frame rates greater than that of a predetermined broadcast frame rate, extracted video therefrom provides smooth and clear video, without edgy or blurred frames. Finally, various exemplary embodiments utilizing enhanced GUI features, such as automatic tracking of subjects of interests, plural GUIs or extraction windows for one or plural (for different points of view) captured images provide advantageous production flexibilities and advantages.

It will be apparent to those skilled in the art that, while exemplary embodiments have been shown and described, various modifications and variations can be made to the invention disclosed herein without departing from the spirit or scope of the invention. Also, the exemplary implementations described above should be read in a non-limiting fashion, both with regard to construction and methodology. Accordingly, it is to be understood that the various embodiments have been described by way of illustration and not limitation.

What is claimed is:

1. A method for tracking and tagging objects of interest in a broadcast, comprising:
    providing an indication of terrain of a golf course; and
    rendering graphics in a broadcast over and relative to the terrain of said golf course, the graphics indicative of a golf experts indications of desirable and undesirable locations for golf play;
    wherein said desirable and undesirable locations are indicated as good and bad spots to land a ball from a preceding position;
    wherein said preceding position comprises a tee shot;
    wherein said indication by an expert takes into account objective and subjective factors; and
    wherein said factors include expert opinion on places that might leave a player in a good or bad position in considering a following shot.

2. A method in accordance with claim 1, wherein the position, size or shape of the indicated good and bad spots vary according to one or more of: the length of the preceding shot; anticipated conditions of the terrain; time of day; lighting; wind conditions; physical capabilities of players; contestant skill sets; and unanticipated hazards.

3. A method in accordance with claim 1, wherein said position, size and shape of the indicated good and bad spots are generated prior to game play.

4. A method in accordance with claim 1, wherein a position, size or shape of the indicated good or bad spots are changed prior to or during game play to reflect a change in at least one factor.

5. A method in accordance with claim 4, wherein said at least one factor comprises one or more of: the length of the preceding shot; anticipated conditions of the terrain; time of day; lighting; wind conditions; physical capabilities of players; contestant skill sets; and unanticipated hazards.

6. A method in accordance with claim 1, wherein said indication is provided by a user interface, comprising one or more of: a computer terminal; a tablet; a touchscreen product; and a mobile device.

7. A method in accordance with claim 1, wherein said indication is provided on a 3D rendering of golf course terrain relative to at least one pre-determined camera shot, which the indication overlaid relative to said terrain.

8. A method in accordance with claim 1, wherein said indication is provided as an overlay utilizing red color for undesirable locations and green color for desirable locations.

9. A method in accordance with claim 1, further comprising providing a broadcast extraction window via a computer system, wherein said broadcast extraction window is configured to position in accordance with tracking data received by said computer system.

10. A method in accordance with claim 9, wherein said extraction window is configured to pan, scan or zoom in response to said tracking data.

11. A system for tracking and tagging objects of interest in a broadcast, comprising:
    a user interface configured to accept a golf expert's indications of desirable and undesirable locations for golf play; and
    a computer system, including a processor that is configured to render graphics in a broadcast over and relative to a golf course terrain, said graphics providing said indications of desirable and undesirable locations for golf play;
    wherein said desirable and undesirable locations are indicated as good and bad spots to land a ball from a preceding position;
    wherein said preceding position comprises a tee shot;
    wherein said indication by an expert takes into account objective and subjective factors; and
    wherein said factors include expert opinion on places that might leave a player in a good or bad position in considering a following shot.

12. A system in accordance with claim 11, wherein the position, size or shape of the indicated good and bad spots vary according to one or more of: the length of the preceding shot; anticipated conditions of the terrain; time of day; lighting; wind conditions; physical capabilities of players; contestant skill sets; and unanticipated hazards.

13. A system in accordance with claim 11, wherein said the position, size and shape of the indicated good and bad spots are generated prior to game play.

14. A system in accordance with claim 11, wherein a position, size or shape of the indicated good or bad spots are changed prior to or during game play to reflect a change in at least one factor.

15. A system in accordance with claim 14, wherein said at least one factor comprises one or more of: the length of the preceding shot; anticipated conditions of the terrain; time of day; lighting; wind conditions; physical capabilities of players; contestant skill sets; and unanticipated hazards.

16. A system in accordance with claim 11, wherein said indication is provided by a user interface, comprising one or more of: a computer terminal; a tablet; a touchscreen product; and a mobile device.

17. A system in accordance with claim 11, wherein said indication is provided on a 3D rendering of golf course terrain relative to at least one pre-determined camera shot, which the indication overlaid relative to said terrain.

18. A system in accordance with claim 11, wherein said indication is provided as an overlay utilizing red color for undesirable locations and green color for desirable locations.

19. A system in accordance with claim 11, further comprising a broadcast extraction window provided by said computer system, wherein said broadcast extraction window is configured to position in accordance with tracking data received by said computer system.

20. A system in accordance with claim 19, wherein said extraction window is configured to pan, scan or zoom in response to said tracking data.

* * * * *